(12) United States Patent
Ranney et al.

(10) Patent No.: US 8,665,132 B2
(45) Date of Patent: Mar. 4, 2014

(54) SYSTEM AND METHOD FOR ITERATIVE FOURIER SIDE LOBE REDUCTION

(75) Inventors: Kenneth I. Ranney, Rockville, MD (US); Lam Huy Nguyen, Laurel, MD (US); Jeffrey P. Sichina, Ocean View, DE (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 360 days.

(21) Appl. No.: 13/046,250

(22) Filed: Mar. 11, 2011

(65) Prior Publication Data

US 2011/0163912 A1    Jul. 7, 2011

Related U.S. Application Data

(63) Continuation-in-part of application No. 12/881,364, filed on Sep. 14, 2010, now Pat. No. 8,193,967, which is a continuation-in-part of application No. 12/331,888, filed on Dec. 10, 2008, now Pat. No. 7,796,829.

(51) Int. Cl.
   *G01S 13/00*    (2006.01)
(52) U.S. Cl.
   USPC .................. 342/25 R; 342/179; 382/276
(58) Field of Classification Search
   USPC ................. 342/25, 179; 382/276
   See application file for complete search history.

(56) References Cited

U.S. PATENT DOCUMENTS

| | | |
|---|---|---|
| 5,111,823 A | 5/1992 | Cohen |
| 5,349,359 A * | 9/1994 | Dallaire et al. ............. 342/195 |
| 5,465,722 A | 11/1995 | Fort et al. |
| 5,673,050 A | 9/1997 | Moussally et al. |
| 5,805,098 A | 9/1998 | McCorkle |
| 6,087,981 A | 7/2000 | Normant et al. |

(Continued)

OTHER PUBLICATIONS

Marc Ressler, Lam Nguyen, Francois Koenig, David Wong, and Gregory Smith, "The Army Research Laboratory (ARL) Synchronous Impulse Reconstruction (SIRE) Forward-Looking Radar," Proceedings of SPIE, Unmanned Systems Technology IX, vol. 6561, Apr. 2007.

(Continued)

*Primary Examiner* — Timothy A Brainard
(74) *Attorney, Agent, or Firm* — Lawrence E. Anderson

(57) ABSTRACT

A method and system for generating images from projection data comprising: at least one processor for processing input data, the input data comprising positional data and image data, the image data comprising frequency data for a predetermined number k frequencies the at least one processor operating to: a) set the frequency data to zero for a predetermined percentage of the k frequencies to form modified frequency data; b) form a preliminary image comprising an array of retained pixel values based upon first positional data and the modified frequency data; c) set the frequency data to zero for a predetermined percentage of the k frequencies to form modified frequency data; d) form a modified image comprising an array of pixels based upon the positional data and the modified frequency data; e) compare the retained array of pixel values to the pixel values of the modified image formed at step (d); f) retain the minimum pixel value at each pixel location to form an image comprising minimum pixel values; g) repeat steps (c) through (f) for L iterations each time retaining an array of pixel values; h) output the image of retained pixel values.

19 Claims, 32 Drawing Sheets

(25 of 32 Drawing Sheet(s) Filed in Color)

(56) References Cited

U.S. PATENT DOCUMENTS

| | | | |
|---|---|---|---|
| 6,400,306 | B1 | 6/2002 | Nohara et al. |
| 7,538,712 | B2 | 5/2009 | Allen et al. |
| 7,796,829 | B2 | 9/2010 | Nguyen et al. |
| 2005/0030393 | A1 | 2/2005 | Tull |
| 2005/0129324 | A1 | 6/2005 | Lemke |

OTHER PUBLICATIONS

Nguyen, L. "Signal and Image Processing Algorithms for the Army Research Lab Ultra-Wideband Synchronous Impulse Reconstruction (UWB SIRE) Radar," Army Research Laboratory Technical Report ARL-TR-4784, Army Research Laboratory Adelphi, MD 20783-1197, Apr. 2009.

Nguyen, L., "Image Resolution Computation for Ultra-Wideband (UWB) Synchronous Impulse Reconstruction (SIRE) Radar" Army Research Laboratory Technical Report ARL-TN-294, Army Research Laboratory Adelphi, MD 20783-1197, Sep. 2007.

Nguyen, L.; Wong, D.; Ressler, M.; Koenig, F.; Stanton, B.; Smith, G.; Sichina, J.; Kappra, K. "Obstacvle Avoidance and Concealed Target Detection Using the Arny Research Lab Ultra-Wideband Synchronous Impulse Reconstruction (UWB SIRE) Forward Imaging Radar," Proceedings of SPIE, Detection and Remediation Technologies for Mines and Minelike Targets XII, vol. 6553, Apr. 2007.

Nguyen, L.; Ressler, M.; Sichina, J. "Sensing Through the Wall Imaging Using the Army Research Lab Ultra-wideband Synchronous Impulse Reconstruction (UWB SIRE) Radar," Proceedings of SPIE, Radar Sensor Technology XII, vol. 6947, Apr. 2008.

Nguyen, L.; Soumekh, M. "System Trade Analysis for an Ultra-wideband Forward Imaging Radar," Proceedings of SPIE, Unmanned Systems Technology VIII, vol. 6230, 2006.

Nguyen, L. H.; Ton, T.; Wong, D.; Soumekh, M. "Adaptive Coherent Suppression of Multiple Wide-bandwidth RFI Sources in SAR," Proceedings of SPIE Int. Soc. Opt. Eng. vol. 5427, 1. 2004.

Nguyen, L.; Soumekh, M. "Suppression of Radio Frequency Interference (RFI) for Equivalent Time-sampling Ultra-wideband Radar," Procedings of SPIE, Algorithms for Synthetic Aperture Radar Imagery XII, 2005.

McCorkle, J.; Nguyen, L. "Focusing of Dispersive Tagets Using Synthetic Aperture Radar," ARL-TR-305; U.S. Army Research Laboratory; Adelphi, MD, Aug. 1994.

Nguyen, L. "Signal Processing Technique to Remove Signature Distortion in ARLSynchronous Impulse Reconstruction (SIRE) Ultra-Wideband (UWB) Radar," ARL-TR-4404; U.S. Army Research Laboratory: Adelphi, MD, Mar. 2008.

Nguyen, L., et al. "Signal Processing Techinques for Forward Imaging Using Ultrawideband Synthetic Aperture Radar," Proceedings of SPIE, vol. 5083, Unmanned Ground Vehicle Technology V, Sep. 2003, pp. 505-518.

M. Ressler et al., "The Army Research Laboratory Ultra-Wideband Testbed Radars," IEEE 1995 International Radar Conference, Alexandria, Va., May 1995.

John W. McCorkle, "Focusing of Synthetic Aperture Ultra Wideband Data," IEEE Int'l Conf on Systems Engineering, Aug. 1992, p. 1-5.

L. Nguyen, "SAR Imaging Technique for Reduction of Sidelobes and Noise," Proc. SPIE, vol. 7308, 73080U (2009): doi:10.1117/12.820480 Online Publication Date: Apr. 29, 2009.

H. C. Stankwitz, R. J. Dallaire, J. R. Fienup, "Nonlinear Apodization for Sidelobe Control in SAR Imagery," IEEE Trans. on Aerospace and Electronic System, vol. 31, No. 1, Jan. 1995, pp. 267-279.

Mark A. Schulze, et al., "Noise Reduction in Synthetic Aperture Radar Imagery Using a Morpohology-based Nonlinear Filter," Proceedings of DICTA96, Digital Image Computing Techniques and Applications (Conference of the Australian Pattern Recognition Society, Brisbane, Australia) pp. 661-666 (Dec. 6-8, 1995 Draft downloaded from Google Scholar).

Richard Rau, et al. "Analytic Models and Postprocessing Techniques for UWB SAR," IEE Transactions on Aerospace and Electronic Systems, vol. 36, No. 4, Oct. 2000.

L. Novak, "Change Detection for Multi-polarization, Multi-pass SAR," Proceedings of SPIE, vol. 5808, 2005, pp. 234-246.

F. Rocca, C. Cafforio, and C. Prati, "Synthetic Aperture Radar: A New Application for Wave Equation Techniques," Geophysical Prospecting, vol. 37, 1989, pp. 809-830.

C. Cafforio, C. Prati, and F. Rocca, "SAR Data Focusing Using Seismic Migration Techniques," IEEE Transactions on Aerospace and Electronic Systems, vol. AES-27, No. 2, Mar. 1991, pp. 194-206.

R. Bamler, "A Comparison of Range Doppler and Wavenumber Domain SAR Focusing Algorithms," IEEE Transactions on Geoscience and Remote Sensing, vol. 30, No. 4, Jul. 1, 1992, pp. 706-713.

L. Happ et al., "Low-Frequency Ultra-Wideband Synthetic Aperture Radar 1995 BoomSAR Tests," IEEE 1996 National Radar Conference, Ann Arbor, Mich., May 1996.

J. McCorkle and L. Nguyen, "Ultra Wide Bandwidth Synthetic Aperture Radar Focusing of Dispersive Targets," HDL-R-ST-R-92-004, Mar. 1992.

Emmanuel Candes, et al. "Robust uncertainty principles: Exact signal reconstruction from highly incomplete frequency information," (IEEE Trans. on Information Theory, 52(2) pp. 489-509, Feb. 2006).

H. Liu, Y. Zhu, J. He, H. Zhao, Q. Fu, "Modelling and Simulation of a Stepped Frequency Radar System Based on LabVIEW", Proceedings of IEEE 2008 International Conference on Radar, Sep. 2-5, 2008, 397-401.

E. J. Candès, M. B. Walkin, "An Introduction to Compressive Sampling," IEEE Signal Processing Magazine, Mar. 2008, 21-30.

L. Nguyen and M. Soumekh, "Improving SAR image of mine-type targets from restricted radar band data," Proc. SPIE 5794, 522 (2005). DOI:10.1117/12.603811.

. Lord and M. Inggs, "Approaches to RF Interference Suppression for VHF/UHF Synthetic Aperture Radar," in IEEE Proceedings of the 1998 South African Symposium on Communications and Signal Processing 1998, Rondebosch, South Africa, pp. 95-100, Sep. 1995.

E. Rignot and J. Van Zyl, "Change Detection Techniques for ERS-1 SAR Data," IEEE Transactions on Geoscience and Remote Sensing, vol. 31, No. 4, 1993, pp. 896-906.

E. Rignot and R. Chellappa, "A Bayes Classifier for Change Detection in Synthetic Aperture Radar Imagery," Proceedings of IEEE International Conference on Accoustics Speech and Signal Processing, vol. 3, 1992, pp. 25-28.

K. Ranney, et al., "Modified Difference Change Detector for Small Targets in Synthetic Aperture Radar Imagery," IEEE Transactions on Aerospace and Electronic Systems, vol. 44, No. 1, 2008, pp. 57-76.

Wehner, D., "High Resolution Radar," Artech House, Norwood MA, Chapter 6, "Synthetic Aperture Radar," pp. 183-271, copyright 1987.

Stolt, R.H., "Migration by Fourier Transform," Geophysics, vol. 43, No. 1, (Feb. 1978) pp. 23-48.

* cited by examiner

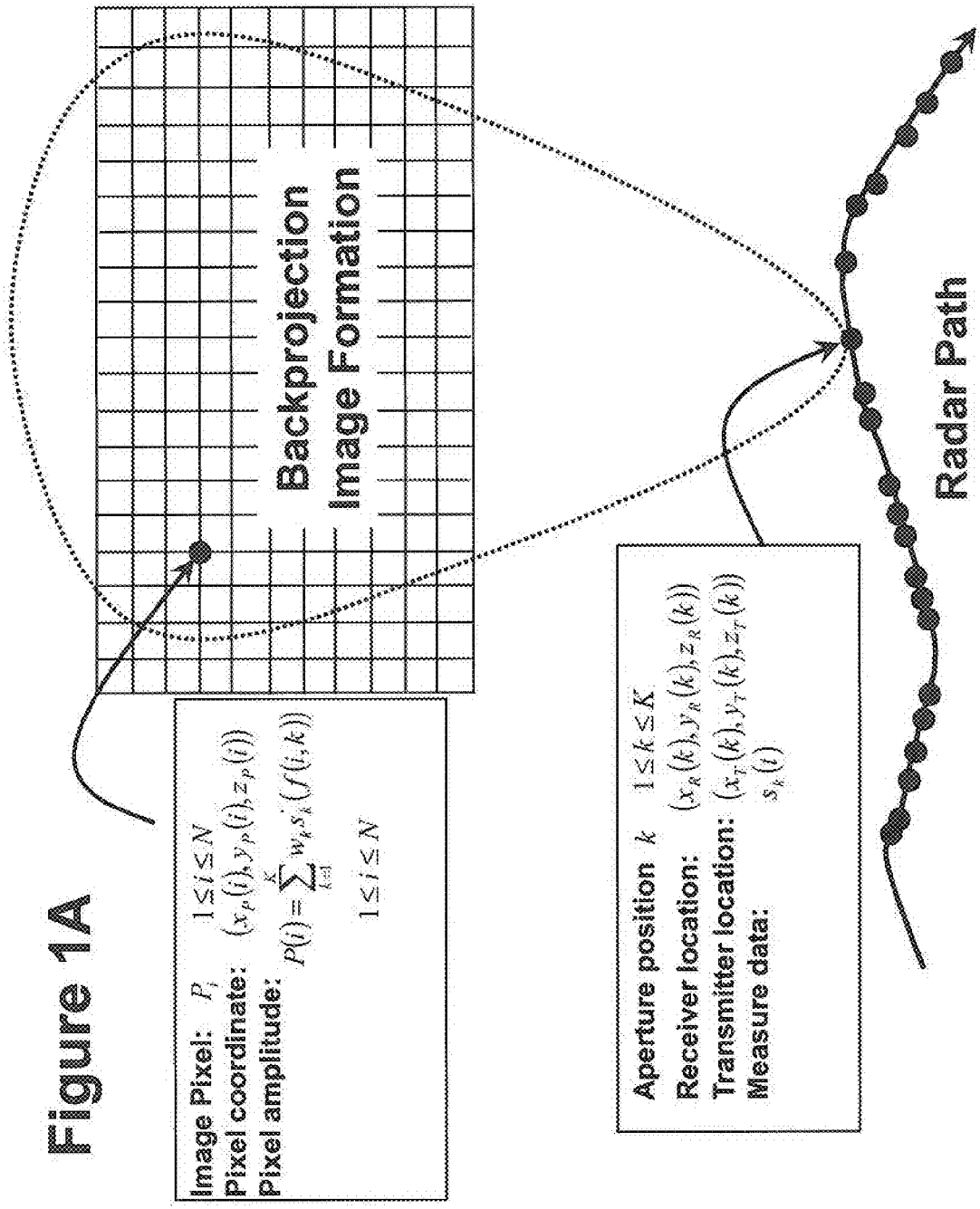

Figure 5- Recursive Sidelobe Minimization (RSM) Technique Using Multiple Compressive Apertures FIGURE 6  NOTE: L<K; each iteration contains a randomly chosen subset of the number of positions of the original apertures Figure 7 - Generate a subset of original radar aperture for each iteration

COMPARISON OF CROSS RANGE PROFILES

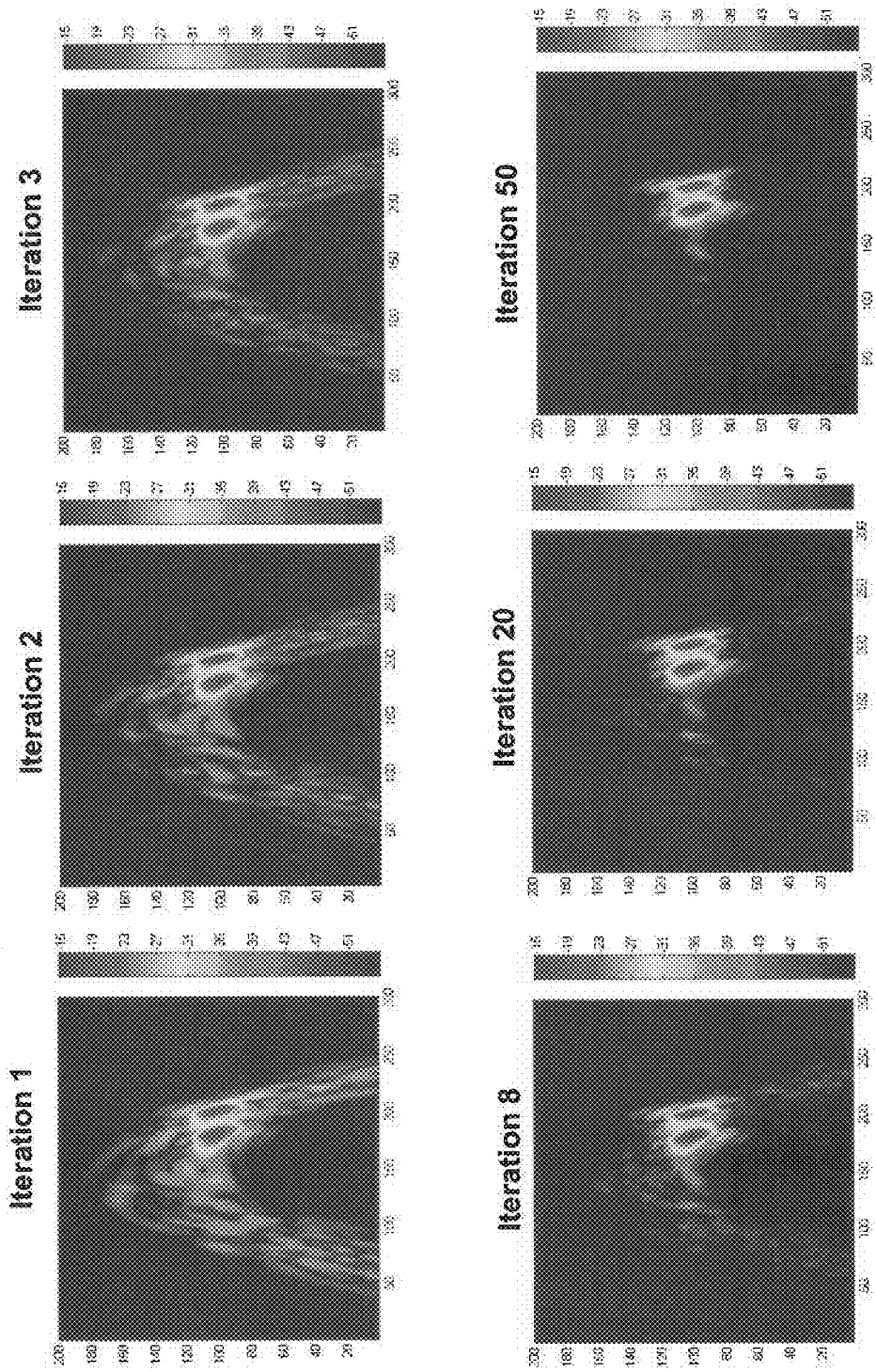

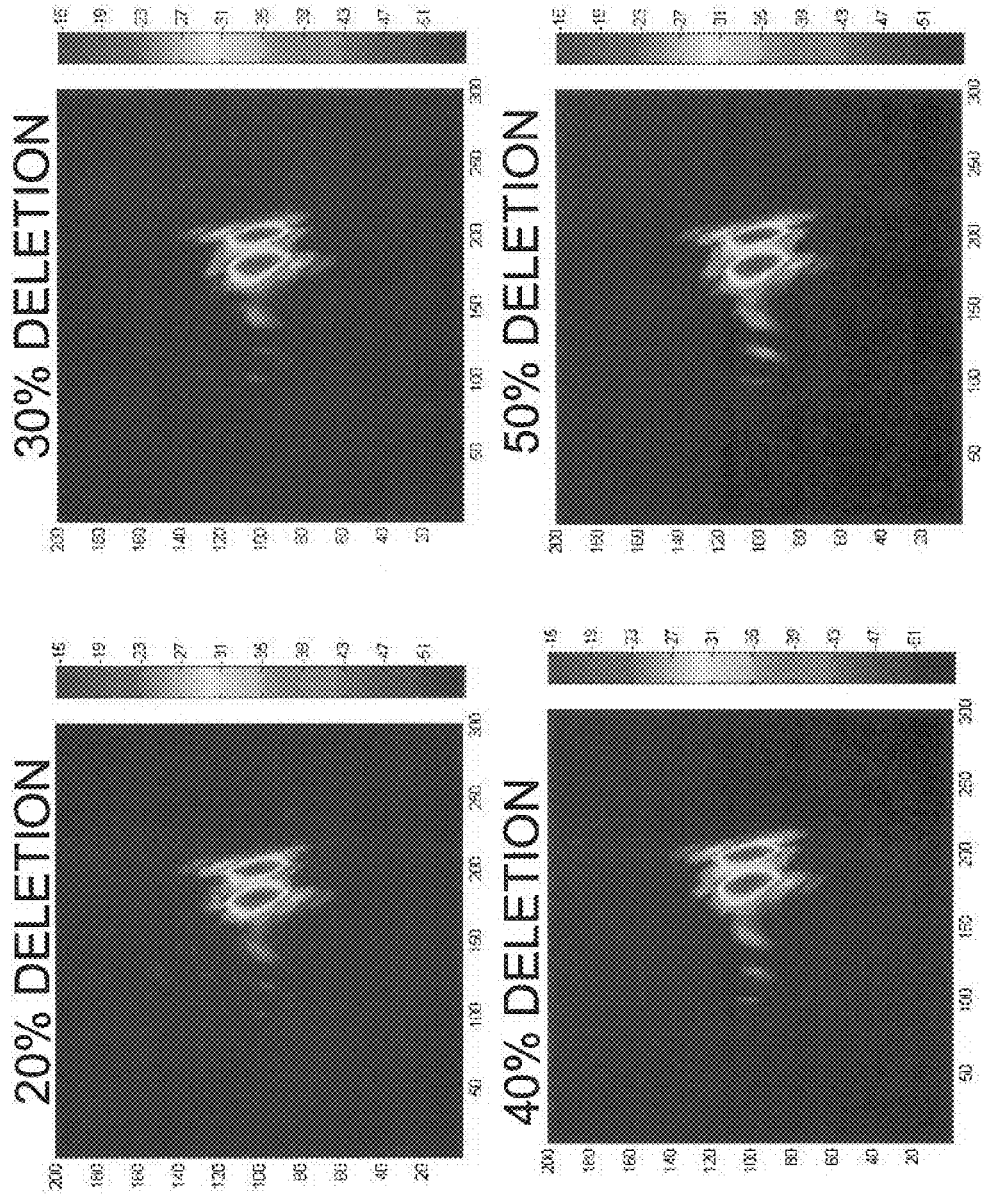
FIGURE 11A COMPARISON OF IMAGES DEVELOPED FROM VARYING PERCENTAGES OF DELETED DATA POINTS

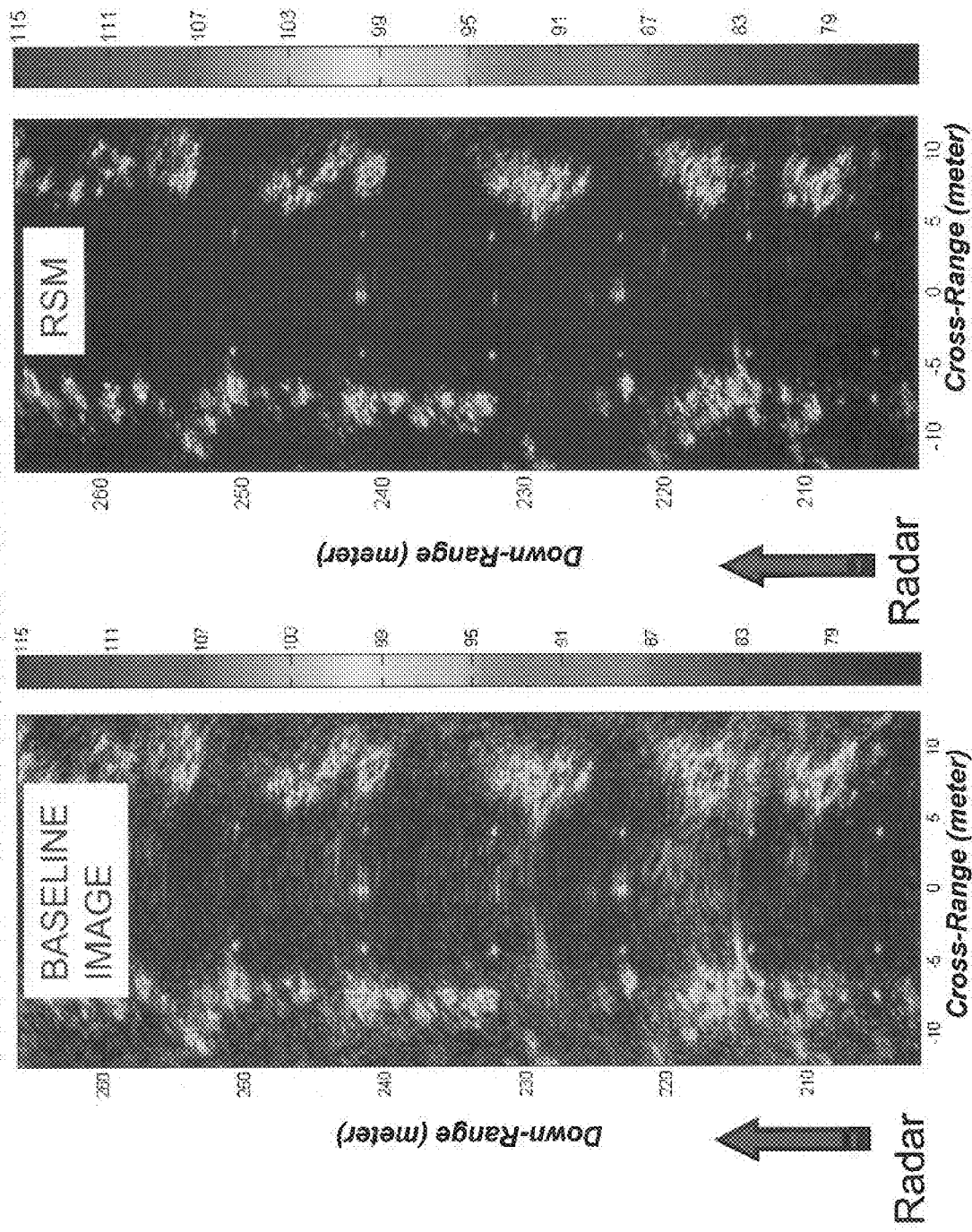
FIG. 12 SIRE FORWARD-LOOKING RADAR

FIG. 14A Baseline Image

FIG. 14B RSM Image

FIG. 14C IF-PC

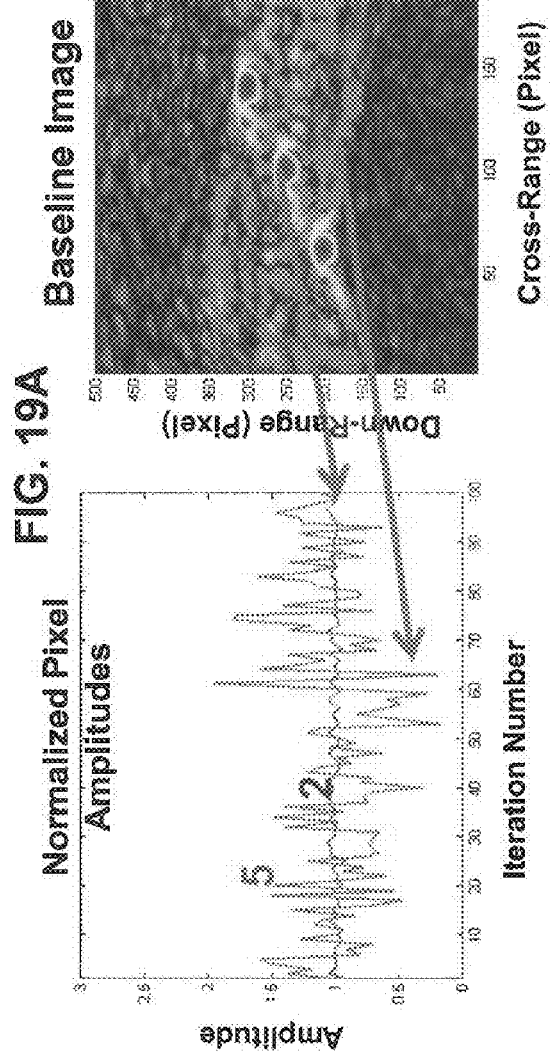
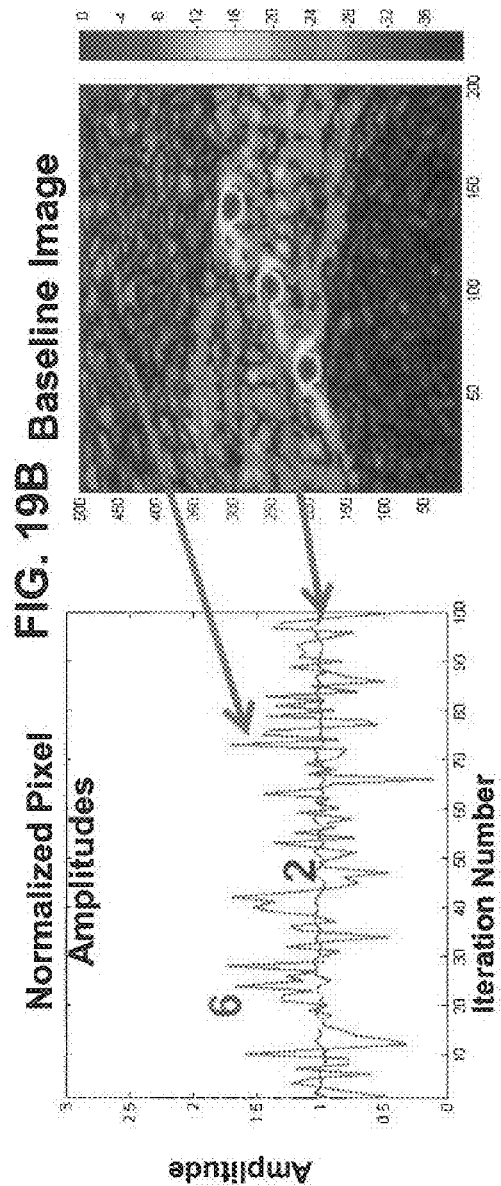
FIG. 19A
FIG. 19B

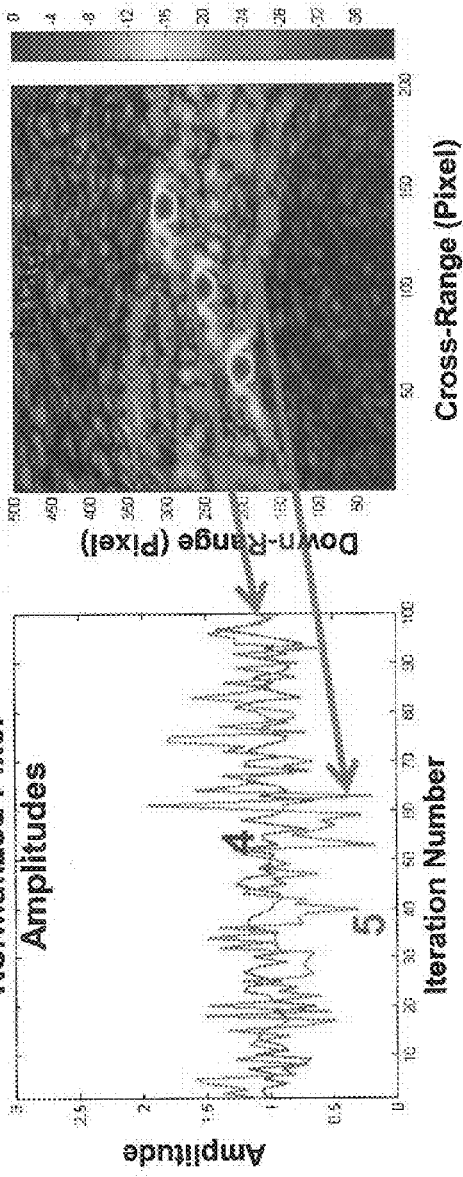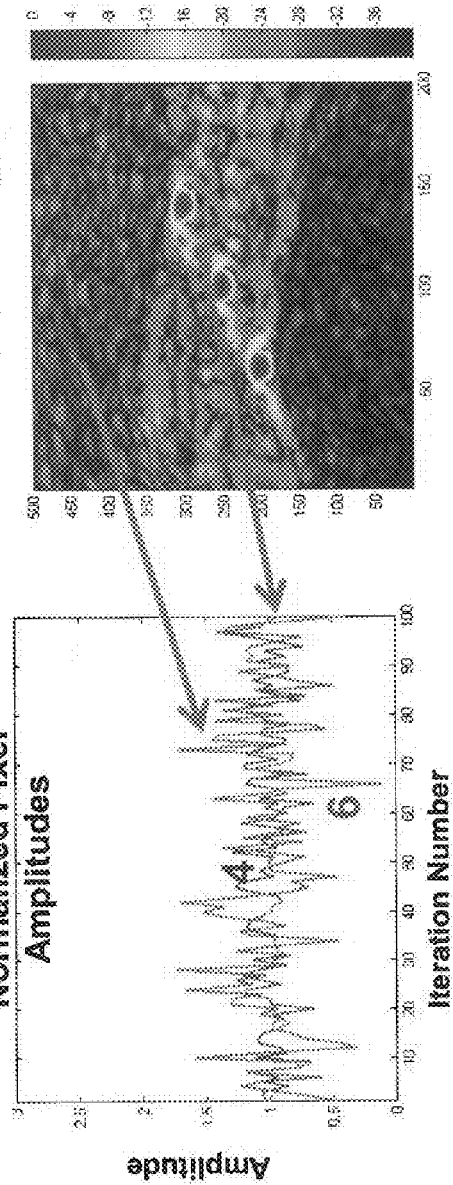
FIG. 20A Baseline SAR
FIG. 20B Baseline Image

FIG. 22 Transmission and Reception of Stepped Frequency Waveform Flowchart Expansion of BOXES 11, 12 & 13.

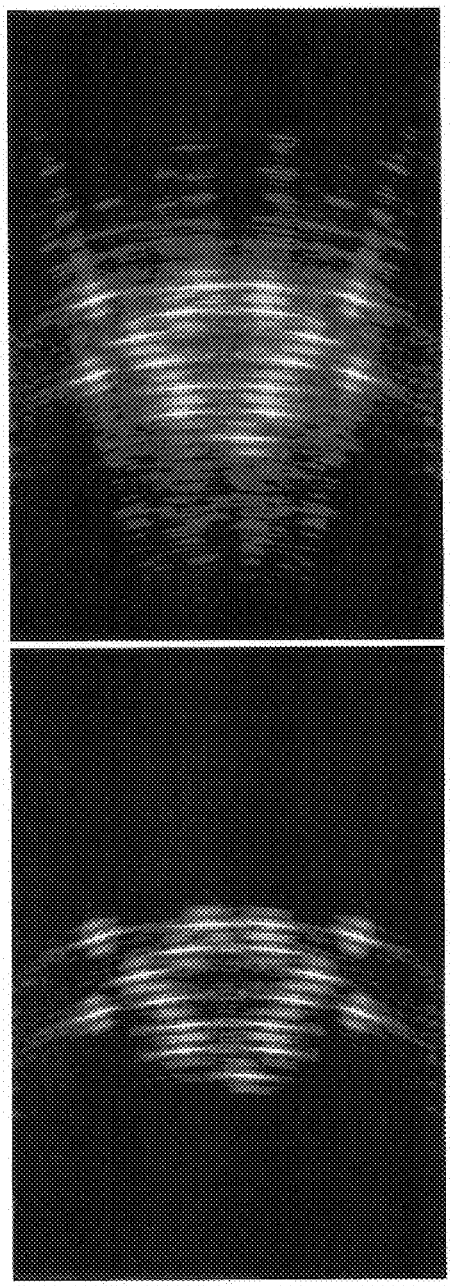
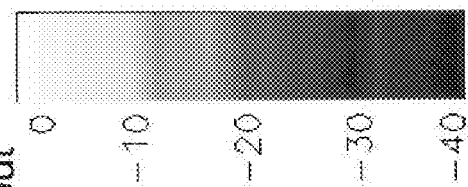
FIG. 27

Frequency
Based RSM

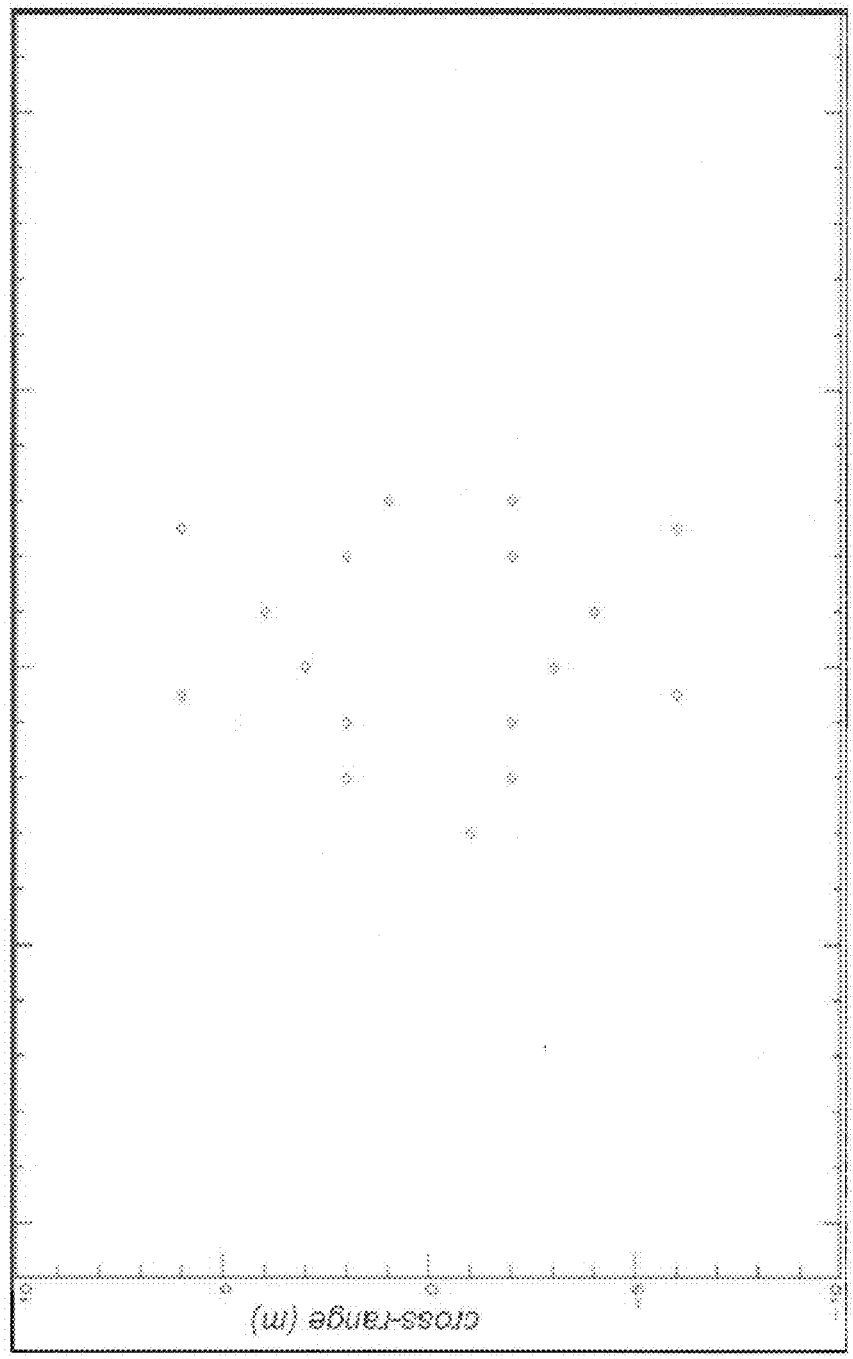
FIG. 29 Target Locations for simulation. Center of the radar receiver array is initially at (0,0).

SYSTEM AND METHOD FOR ITERATIVE FOURIER SIDE LOBE REDUCTION

CROSS-REFERENCE TO RELATED APPLICATIONS

This application is a continuation-in-part of and claims priority to U.S. application Ser. No. 12/881,364, filed on Sep. 14, 2010, entitled "Method and System for Forming Very Low Noise Imagery Using Pixel Classification," and U.S. patent application Ser. No. 12/331,888, filed on Dec. 10, 2008, now U.S. Pat. No. 7,796,829, entitled "Method and system for forming an image with enhanced contrast and/or reduced noise." Both U.S. patent application Ser. No. 12/331,888 and U.S. Pat. No. 7,796,829 are hereby incorporated by reference as though fully rewritten herein.

STATEMENT OF GOVERNMENT INTEREST

The invention, described herein may be manufactured, used, and licensed by or for the United States Government.

REFERENCE TO PARTIAL COMPUTER PROGRAM LISTING

Appendix A contains a partial computer listings adapted for a preferred embodiment of the present invention.

BACKGROUND OF THE INVENTION

The present invention relates to the generation of images from projection measurements. Examples of images generated from projection measurements include two-dimensional and three-dimensional SAR (synthetic aperture radar) systems. SAR is a form of radar in which the large, highly-directional rotating antenna used by conventional radar is replaced with many low-directivity small stationary antennas scattered over some area near or around the target area. The many echo waveforms received at the different antenna positions are post-processed to resolve the target. SAR can be implemented by moving one or more antennas over relatively immobile targets, by placing multiple stationary antennas over a relatively large area, or combinations thereof. A further example of images generated from projection measurements are ISAR (inverse SAR) systems, which image objects and many features on the ground from satellites, aircraft, vehicles or any other moving platform. SAR and ISAR systems are used in detecting, locating and sometimes identifying ships, ground vehicles, mines, buried pipes, roadway faults, tunnels, leaking buried pipes, etc., as well as discovering and measuring geological features, forest features, mining volumes, etc., and general mapping. For example, as shown in FIG. 1 of U.S. Pat. No. 5,805,098 to McCorkle, hereby incorporated by reference, an aircraft mounted detector array is utilized to take ground radar measurements. Other examples of systems using projection measurements are fault inspection systems using acoustic imaging, submarine sonar for imaging underwater objects, seismic imaging system for tunnel detection, oil exploration, geological surveys, etc., and medical diagnostic tools such as sonograms, echocardiograms, x-ray CAT (computer-aided tomography) equipment and MRI (magnetic resonance imaging) equipment.

Systems which produce images from projection data generally use techniques in the time domain, where a backprojection-type algorithm is used, or frequency domain, where Fourier transforms are used. Since a Fast Fourier Transform (FFT) technique, such as a technique known as the "ω-k" implementation, requires data to be equally spaced, FFT-based techniques produce sub-optimal images when the data source is moving uncontrollably, such as an aircraft buffeted by winds or vehicles in rough terrain. Non-Uniform spacing requires a Discrete Fourier Transform (DFT) which increases computation expense relative to a backprojector technique. Also, two-dimensional FFT's are not well suited to multiprocessor-based supercomputers because they face a corner-turn interprocessor communication bottleneck.

While there are many forms of Fourier-based algorithms for SAR processing, they fall into two broad classes known as "strip-map" mode and "spot light" mode. The most robust technique is the ω-k technique, also known as seismic migration. The advantage of the ω-k algorithm over the backprojection algorithm is speed. The ω-k algorithm is an order $N^2 \log_2(N)$ implementation—much faster than $N^3$ for large images and data sets.

Time domain backprojection-based techniques have been used for numerous applications, including x-ray CAT scans, MRI and sonograms. Historically, medical people have preferred backprojection because its artifact levels were lower than those using fast Fourier transform (FFT) approaches. Efforts in the past to speed up the backprojection process have focused on fast index generation. The algorithm form used by the medical industry (e.g., Star Computers) for x-ray CAT scans requires approximately $2N^3$ adds to form an N by N image from N projections—$N^3$ adds for indexing operations, and $N^3$ adds for accumulating the projections into the image. Seismologists and people using SAR have also used backprojection.

Synthetic aperture radar systems have been used in applications such as area mapping, surveillance, and target detection. The radar is usually mounted on an aircraft or a vehicle configured with transmitting and receiving antennas to transmit and measure the reflected radar signals from areas of interest. Through signal processing, the reflected radar signals along the flight path are combined to form the SAR imaging for side looking or forward looking surveillance.

SAR imaging is complex for a variety of reasons. First, the data is not inputted at equally distant (or known) points. Instead, data may be inputted in a non-uniform manner from an aircraft that is buffeted by the wind or from a ground vehicle that traverses rough ground. Therefore, motion compensation must be introduced in order to produce sharp images. Second, the subject objects need not be point sources but may be dispersive—where energy is stored and "re-radiated" over time. Ground penetrating SAR adds the complication that the media propagation velocity varies which complicates seismic processing. For many SAR applications, especially for high-resolution, ultra-wide-angle (UWA), ultra-wide-bandwidth (UWB) surveillance systems, the task is particularly problematic because the data sets are large, real-time operation is essential, and the aperture geometry is not controlled. For small aircraft buffeted by the wind can affect SAR data due to significant off-track motion and velocity changes. As a result, the data is not sampled at equally spaced intervals.

Backprojection techniques provide many advantages; including sharper images. Although prior art backprojector implementations may generate image artifacts; they are constrained to be local to the object generating the artifacts and generally lie within the theoretical sidelobes. Side lobes are the lobes of the radiation pattern that are not the main beam or lobe. In an antenna radiation pattern or beam pattern, the power density in the side lobes is generally much less than that in the main beam. It is generally desirable to minimize the sidelobe level (SLL), commonly measured in decibels relative to the peak of the main beam. The concepts of main and side lobes apply to (but are not limited to) for example, radar and optics (two specific applications of electromagnetics) and sonar. The present invention is directed to techniques which minimize the effects of theoretical sidelobes in order to provide enhanced images.

Backprojector techniques also allow for non-uniform spacing of the projection data. The non-uniform spacing is directly accounted for in the index generation, which is important when compensating for aircraft motion.

Conventional time domain image formation, or backprojection, from SAR data, is accomplished by coherently summing the sampled radar returns for each pixel. In this context, coherent summation can be thought of as time-shifting the signal obtained at each aperture position (to align them to a particular pixel) and adding across all aperture positions to integrate the value at that pixel. This time-align-and-sum sequence is repeated for every pixel in the image.

A method and system for forming images by backprojection is explained in U.S. Pat. No. 5,805,098 to McCorkle, hereby incorporated by reference as though fully rewritten herein. Specifically, FIG. 2 of the 1998 patent illustrates antennas at positions 208 along axis 204 in an array that observe pixels 202 in the near field of the array. A relative position of each pixel (q,r) with respect to each antenna position j defines a vector 206. For each pixel (q,r), the disclosed process time-shifts the signals obtained at each aperture position j (to align, or stack, them at a particular pixel location) to correct the signals for propagation time along each vector 206 and then adds across all aperture positions to integrate to the value at the pixel. Thus, signals propagating from that location are in-phase and reinforced, while signals propagating from other locations are not in phase and integrate toward zero. The image is generated by forming such a sum for each pixel as shown in equation (1A) below.

In equation (1A) below, the pixels of the image area are indexed by (q,r) and the aperture positions are indexed by j, where j=0 . . . L−1 and L is the number of elements in the aperture. If $s_j(t)$ represents the range-compensated ($R^2$ propagation loss corrected, where R is range) voltage received at the $j^{th}$ aperture position as a function of time (t), $z_j$ is an aperture weighting to shape the sidelobes, for example, with a Hamming window, or to account for the aperture spacing, and $T_{q,r,j}$ is the time shift necessary to align the signal received at sensor position j to the pixel at position (q,r) (a function of the round-trip time from sensor phase center to pixel position), then the value of the focused pixel at image position (q,r) is given by:

$$f_{q,r}(t) = \sum_{j=0}^{L-1} z_i \cdot s_j(t + T_{q,r,j}). \tag{1a}$$

Here, t describes how the focused signal at location (q,r) varies with time, and is useful for studying late-time target ringing. This description of backprojection considers the case where t is fixed for the entire image.

Accurately obtaining the time-shifted values $s_j(t+T_{q,r,j})$ requires a time domain interpolation of the sampled received signals. Prior art techniques included the following steps:

1A. Up-sample and low-pass filter the received signal to produce a finer resolution signal $s_j$.
2A. Compute the floating point indexes into the sequence s.sub.j corresponding to time t+T.sub.q,r,j.
3A. Linearly interpolate between samples to obtain an approximation of s.sub.j (t+T.sub.q,r,j).

The following references give an overview of the state of the art and are hereby incorporated by reference in their entireties:
1. J. McCorkle, "Focusing Of Synthetic Aperture Ultra Wideband Data," IEEE Int'l Conf on Systems Engineering, August, 1992, p. 1-5;
2. J. McCorkle and Lam Nguyen, "Focusing of Dispersive Targets Using Synthetic Aperture Radar," ARL-TR-305, August, 1994;
3. R. Stolt, "Migration by Fourier Transform," Geophysics, Vol. 43, p. 23ff;
4. F. Rocca, C. Cafforio, and C. Prati, "Synthetic Aperture Radar: A New Application for Wave Equation Techniques," Geophysical Prospecting, Vol. 37, 1989, pp. 809-30.
5. C. Cafforio, C. Prati, and F. Rocca, "SAR Data Focusing Using Seismic. Migration Techniques," IEEE Transactions on Aerospace and Electronic Systems, Vol. AES-27, No. 2, March, 1991, pp. 194-206;
6. R. Bamler, "A Comparison of Range Doppler and Wavenumber Domain SAR. Focusing. Algorithms," IEEE Transactions on Geoscience and Remote. Sensing, Vol. 30, No. 4, Jul. 1, 1992, pp. 706-713;
7. M. Ressler et al., "The Army Research Laboratory Ultra-Wideband Testbed Radars," IEEE 1995 International Radar Conference, Alexandria, Va., May, 1995; and
8. L. Happ et al., "Low-Frequency Ultra-Wideband Synthetic Aperture Radar 1995 BoomSAR Tests," IEEE 1996 National Radar Conference, Ann Arbor, Mich., May, 1996.

An example of a forward-looking Synchronous Impulse Reconstruction (SIRE) radar that can be vehicle-mounted has been designed and built by the Army Research Lab. A more complete description of the SIRE radar can be found in M. Ressler, L. Nguyen, F. Koenig, D. Wong, and G. Smith, "The Army Research Laboratory (ARL) Synchronous Impulse Reconstruction (SIRE) Forward-Looking Radar", Proceedings of SPIE, Unmanned Systems Technology IX, April 2007, hereby incorporated by reference. The SIRE radar has two transmitters and an array of receiving antennas. The two transmitters alternatively transmit wide bandwidth impulses to illuminate the area in front of the vehicle. An array of receiving antennas measures the returned radar signals. The wide bandwidth of transmitted impulses provides the down-range resolution while the array of receiving antennas provides the cross-range resolution. It has been shown that the configuration with two transmitters located at the end of the array is the optimum configuration to achieve cross-range resolution while minimizing the number of required transmitters.

After data is acquired by the radar hardware, it is transferred to a computer for signal processing and image formation. The signal processing stages include a) self-interference extraction, b) removing radar signature distortion due to moving platform, and c) sub-band filtering. The self-interference processing step to extract the interference components from the returned radar signals and the technique to remove the phase and shape distortion in radar signals due to the motion of the radar platform are described in the publication by Lam Nguyen, entitled "Signal Processing Technique to Remove Signature Distortion in ARL Synchronous Impulse Reconstruction (SIRE) Ultra-Wideband (UWB) Radar," Army Research Laboratory Technical Report, ARL-TR-4404, March 2008, hereby incorporated by reference.

After all the signal processing steps are applied to the returned radar signals, the processed radar range profiles may be used for forming a SAR image. In a preferred embodiment, the back-projection algorithm is utilized for the image formation step. See, John McCorkle and Lam Nguyen, "Focusing of Dispersive Targets Using Synthetic Aperture Radar," Army Research Laboratory Report, ARL-TR-305, August 1994.

FIG. 1A illustrates an example utilizing the basic concept of the backprojection imaging algorithm. The radar is mounted on a moving platform. It transmits radar signals to illuminate the area of interest and receives return signals from the area. Using the motion of the platform, the radar collects K data records along its path (or aperture). In general the aperture could be a line, a curve, a circle, or any arbitrary shape. The receiving element k from the aperture is located at the coordinate $(x_R(k), y_R(k), z_R(k))$. Far bistatic radar (the transmitting antenna is separate from the receiving antenna) the transmitting element k from the aperture is located at the coordinate $(x_T(k), y_T(k), z_T(k))$. For monostatic radar (the transmitting antenna is the same as or co-located with the receiving antenna) the transmitting coordinates $(x_T(k), y_T(k), z_T(k))$ would be the same as the receiving coordinates $(x_R(k), y_R(k), z_R(k))$. Since the monostatic radar case is a special case of the bistatic radar configuration, the algorithm described here is applicable for both configurations. The returned radar signal at this receiving element k is $s_k(t)$. In order to form an image from the area of interest, we form an imaging grid that consists of N image pixels. Each pixel $P_i$ from the imaging grid is located at coordinate $(x_P(i), y_P(i), z_P(i))$. The imaging grid is usually defined as a 2-D rectangular shape. In general, however, the image grid could be arbitrary. For example, a 3-D imaging grid would be formed for ground penetration radar to detect targets and structures buried underground. Another example is 3-D image of inside human body. Each measured range profile $s_k(t)$ is corrected for the $R^2$ propagation loss, i.e. $s'_k(t) = R^2(t)s_k(t)$, where $$R(t) = \frac{ct}{2}$$

and $c = 2.997e^8$ m/sec. The backprojection value at pixel P(i) is $$P(i) = \sum_{k=1}^{K} w_k s'_k(f(i,k)), \qquad (1)$$
$$1 \le i \le N$$

where $w_k$ is the weight factor and f(i,k) is the delay index to $s'_k(t)$ necessary to coherently integrate the value for pixel P(i) from the measured data at receiving element k.

The index is computed using the round-trip distance between the transmitting element, the image (pixel), and the receiving element. The transmitting element is located at the coordinate $(x_T(k), y_T(k), z_T(k))$. The distance between the transmitting element and the image pixel P(i) is:

$$d_1(i,k) = \sqrt{[(x_T(k) - x_P(i))]^2 + [(y_T(k) - y_P(i))]^2 + [(z_T(k) - z_P(i))]^2} \qquad (2)$$

The distance between the receiving element and the image pixel P(i) is $$d_2(i,k) = \sqrt{[(x_R(k) - x_P(i))]^2 + [(y_R(k) - y_P(i))]^2 + [(z_R(k) - z_P(i))]^2} \qquad (3)$$

The total distance is $$d(i,k) = d_1(i,k) + d_2(i,k) \qquad (4)$$

The delay index is $$f(i,k) = \frac{d(i,k)}{c} \qquad (5)$$

FIG. 1B illustrates a typical imaging geometry for an ultra wide band forward looking (e.g., SIRE) radar. In this case, the radar is configured in forward-looking mode instead of side-looking mode as illustrated in FIG. 1A. In this forward-looking mode, the radar travels and radiates energy in the same direction. The general backprojection algorithm described applies to the embodiment of FIG. 1B. As seen in FIG. 1B, the radar travels in parallel to the x-axis. The back-projection image formation is combined with the mosaic technique. The large area image is divided into sub-images. The size of each sub-image may be, for example, 25 m in cross-range and only 2 m in down-range (x-axis direction). The radar starts at coordinate A, which is 20 m from sub-image 1, and illuminates the entire image area to the right.

The following is a description of the platform 10 in FIG. 1B as it passes four sequential positions $10^A$, $10^B$ $10^C$ & $10^D$ located at x-coordinates A, B, C & D, respectively. The formation of the first sub-image begins when platform 10 is at the coordinate A, 20 meters from the block labeled "$1^{st}$ sub-image." As platform 10 travels in the x direction (as shown in FIG. 1B), signals emitted from platform 10 illuminates an entire image area to the right of platform 10, and the reflected signals are received by an array of 16 physical receiving antennas 11 positioned on the front of the platform 10. Formation of the first sub-image ends when platform 10 reaches coordinate C, at approximately 8 m from the block labeled "$1^{st}$ sub-image." Accordingly, the radar signal data for the first (full-resolution) sub-image is received as radar platform 10 travels a distance of 12 meters (20 m−8 m=12 m) from coordinates A to C, for formation of a two dimensional (2D) aperture.

The distance traveled during the formation of the two-dimensional (2-D) aperture is represented by an arrow in FIG. 1B labeled "Aperture 1." When the platform 10 reaches coordinate B, a distance of 2 meters from coordinate A in FIG. 1B, the formation of the "$2^{nd}$ sub-image" begins, and as the platform 10 travels to coordinate D, it uses the received data to form a second 2-D aperture. The distance traveled by platform 10 is represented by an arrow in FIG. 1B labeled "Aperture 2." Note that the two apertures are overlapped by 10 m and the second aperture is "advanced" by 2 m with respect to the first aperture. Sub-images 1 and 2 are formed from the 2-D apertures using the same length of travel (12 meters) of the radar. This process is applied to ensure that image pixels have almost the same (within a specified tolerance) resolution across the entire large area. The sub-images are formed from the radar range profiles using the back-projection algorithm.

FIG. 2 shows the back-projection algorithm applied to form a sub-image. The procedure mathematically described with respect to FIG. 1A in the above paragraphs may also be applied to this imaging scenario. In this case, the radar aperture is a rectangular array that is formed by an array of 16 receiving elements (that spans 2 meters) and the forward motion of the platform (12 meter for forming each sub-image). The imaging grid in this case is defined as a rectangular array of 25×2 meter.

FIG. 3 shows a SAR image formed using the above algorithm using simulated data of two targets (points). The image, is displayed using 40 dB of dynamic range. However, "energy" from the two point targets is spread throughout the image and creates severe sidelobes. There are two sources that generate the imaging artifacts in this case: a) aperture aliasing (small aperture compared to the large image cross-range swath), and b) the errors from the position measurements system. In reality, there are many other sources that contribute to the noise floor of the resulting image. This created a challenging problem for the detection of targets of smaller amplitudes since they might be obscured or even embedded in the noise floor.

The term "noise" as used herein relates to image noise. There are many sources that cause noise in the resulting image. Noise can be divided into two categories: additive noise and multiplicative noise. System noise, thermal noise, quantization noise, self-interference noise, radio frequency interference (RFI) noise are some examples of the additive noise. Multiplicative noise is much more difficult to deal with since it is data dependent. Some sources that cause multiplicative noise include: timing jitter in data sampling, small aperture size compared to image area, the under-sampling of aperture samples, the non-uniform spacing between aperture samples, errors in position measurement system, etc. Multiplicative noise results in undesired sidelobes that create high noise floor in the image and thus limit the ability to detect targets with smaller amplitudes.

Radar and other imaging systems currently suffer various noise sources that prevent the generation of very high contrast images. As a result, difficult targets (with low amplitudes) are often obscured or even embedded, in the noise level of the image background. Moreover, sidelobes from large targets are mistaken as targets of interest. Recently the ARL has designed and built a new ultra-wideband imaging system for the detection of difficult targets. Currently, there exists a need for an improved signal processing technique which reduces unwanted noise and enhances image reproduction.

Stepped-Frequency radar technology comprises hardware and software subsystems that have attained advanced levels of technological maturity. The popularity of the paradigm attests to both its practicality and its analytic tractability. Stepped-frequency radar systems achieve high resolution in the time domain by effectively measuring the frequency-domain response over a large bandwidth and then transforming from frequency to time. In particular, a series of pulses is transmitted, with each pulse centered at a specific frequency. The reflected waves from a target are coherently sampled, and since the transmitted frequencies are evenly-spaced, a high resolution time-domain, waveform can readily be constructed via a Fast Fourier Transform (FFT). The time-domain resolution of the system is determined by the total bandwidth (i.e. the number of frequency steps and the frequency step size). The duration of the high-resolution signature will be fixed by the pulse width and the frequency step size.

When operating at lower frequencies, it is possible for stepped-frequency radars to interfere with indigenous radio frequency (RF) transmissions, such as television stations, cell phones, and air traffic control. Hence, it becomes necessary for a radar operator to "notch-out" certain transmit frequencies, thereby producing unwanted artifacts in the final radar signature. These effects are well-documented in the literature, and efforts have been undertaken to mitigate them, with varying degrees of success. 2. STEPPED FREQUENCY RECURSIVE SIDELOBE MINIMIZATION Non-linear techniques for reducing sidelobe artifacts have existed for several years. For example, non-linear apodization techniques, developed by Stankwitz et al. 6-7, exploit the time- and frequency-domain characteristics of specific weighting windows to reduce sidelobe artifacts in synthetic aperture radar (SAR) imagery. Another recently presented technique, recursive sidelobe minimization (RSM), operates strictly in the time-domain, and it combines concepts from the theories of both apodization and compressive sensing 8-10 to reduce image artifacts. Unfortunately, this restriction of the current RSM formulation to the time domain precludes elimination of artifacts introduced by frequency notching.

BRIEF SUMMARY OF THE INVENTION

The present invention is directed, inter alia, to a procedure for reducing the severity of radar signature artifacts through the incorporation of a non-linear processing technique that suppresses sidelobes introduced by frequency-domain notching. An example of a preferred embodiment technique is referred to as "stepped-frequency recursive sidelobe, minimization" (SFRSM).

The methodology of the present invention comprises, adaptation of the RSM procedure that has been implemented to mitigate the effects of sidelobes introduced by frequency-notching. That is, the randomization introduced as part of the time-domain RSM processing is extended to the frequency domain prior to formation of the high resolution range (HRR) profile. The HRR profile is simply the IFFT of the frequency domain (low range resolution, or LRR) profile.) Hence, in the same way that the user specifies a percentage of the available time-domain samples to retain for RSM image formation, the user also specifies the percentage of the available frequency-domain samples to retain for SFRSM HRR signature formation. Once the SFRSM HRR profile of a preferred embodiment has been created, the normal image-formation processing can proceed via application of a procedure such as time-domain back-projection algorithm of choice.

A block diagram of the processing paradigm as implemented in a synthetic aperture radar (SAR) system is shown in FIG. 21, wherein a dashed box indicates the location of the proposed improvements. A preferred embodiment comprises a pre-processing sidelobe reduction algorithm, a sidelobe reduction post-processing algorithm, and an iterative processing procedure indicated by the L-iteration loop in the diagram. Note that the existing SAR image formation algorithm, indicated by a solid rectangle within the larger dashed rectangle, remains an integral part of the enhanced formulation; hence, the invention could be incorporated into any stepped-frequency SAR image formation process.

When implemented as described, the preferred embodiment technique substantially reduces the severity of sidelobe artifacts due to, the elimination of n of the N frequencies comprising the stepped frequency waveform.

Although the present invention bears some similarity to U.S. Pat. No. 7,796,829 to Nguyen (hereinafter '829 Nguyen patent), the preferred embodiment methodology addresses a problem that is fundamentally different than that addressed in the '829 Nguyen patent. The problem formulation of '829 Nguyen patent concentrated on artifacts observed when the entire transmitted bandwidth is available. The present invention concentrates on, inter artifacts induced by limiting the allowed transmission frequencies to a subset of the available band (i.e. "notching out" specific frequency steps).

FIG. 21 is a block diagram of a preferred embodiment methodology, and its relation to the current image formation paradigm. The processing steps denoted as "Sidelobe-Reduction" processing, in FIG. 21 are described in more detail by the flowcharts in FIG. 23. From the flowchart one can see that the preprocessing box depicted in FIG. I comprises: (i) excision of k randomly selected frequency steps from the N−n steps available after transmission restriction, (ii) weighting of the remaining samples (iii) calculation of the high resolution time-domain signature via an FFT. Similarly, the postprocessing box comprises, a pixel-by-pixel comparison of the magnitude of the current image with the minimum value calculated for that pixel up to the current iteration. The smallest value in this comparison becomes the minimum value stored at those pixel coordinates. Finally, as shown in both figures, the process terminates after L iterations.

FIG. 24 is a flowchart depicting implementation of a preferred embodiment of the invention. Simulations were performed to determine the utility and practicality of preferred embodiment implementation, and the results are shown in FIGS. 25, 26, 27, and 29 for two different target configurations. The simulated radar system configuration was based on the Army Research Laboratory's Synchronous Impulse Reconstruction (SIRE) radar in that it included 2 transmitters and 16 receivers, all defined to be situated 2 m above the ground. The receivers were equally spaced across a horizontal aperture spanning 2 m, and the transmitters were co-located with the two outside antennas. The radar collected all frequency steps simultaneously at regular intervals as the vehicle moved forward. As evident from the figure, the proposed method effectively mitigated many imaging artifacts that are readily apparent in the original imagery.

A preferred embodiment comprises a system for generating images from projection data comprising: at least one processor for processing input data, the input data comprising positional data and image data, the image data comprising frequency data for a pre-determined number k frequencies the at least one processor operating to: a) set the frequency data to zero for a predetermined percentage of the k frequencies to form modified frequency data; b) form a preliminary image comprising an array of retained pixel values based upon first positional data and the modified frequency data; c) set the frequency data to zero for a predetermined percentage of the k frequencies to form modified frequency data; d) form a modified image comprising an array of pixels based upon the positional data and the modified frequency data; e) compare the retained array of pixel values to the pixel values of the modified image formed at step (d); f) retain the minimum pixel value at each pixel location to form an image comprising minimum pixel values; g) repeat steps (c) through (f) for L iterations each time retaining an array of pixel values; h) output the image of retained pixel values.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

FIG. 1A is a schematic diagram of a generalized conventional technique for image projection.

FIG. 11 is an illustration of resulting images at various, iterations.

FIG. 11A is an illustration of the effect of removing a different percentage of data points from the apertures from which the images were derived.

FIG. 12 is an illustration of recursive sidelobe minimization technique using data from ARL SIRE forward looking radar.

FIG. 19A illustrates a comparison between the normalized pixel amplitudes of a pixel that belongs to second target (from FIG. 18) (shown as a blue line in FIG. 19A) and a pixel that belongs to a sidelobe (5), shown as a red line in FIG. 19A.

FIG. 19B illustrates same distributions (as FIG. 19A) for the second target's (labeled as 2) pixel, as shown by a red line, and a noise pixel (6), as shown by a red line.

FIG. 20A illustrates the normalized amplitudes of 4th target (slightly fluctuated) as shown by the blue line in FIG. 20A, in comparison to the normalized amplitudes of the sidelobe pixel, as shown by the red line in FIG. 20A.

FIG. 20B is an illustration comparing the normalized amplitudes of 4th target (of FIG. 18) versus a noise pixel (6) (of FIG. 18).

FIG. 27 illustrates SAR Images created both with and without a preferred embodiment methodology (SFRSM).

FIG. 29 illustrates target locations for simulation. Center of the radar receiver array is initially at (0,0) configuration.

DETAILED DESCRIPTION OF PREFERRED EMBODIMENTS

Figure 1B:
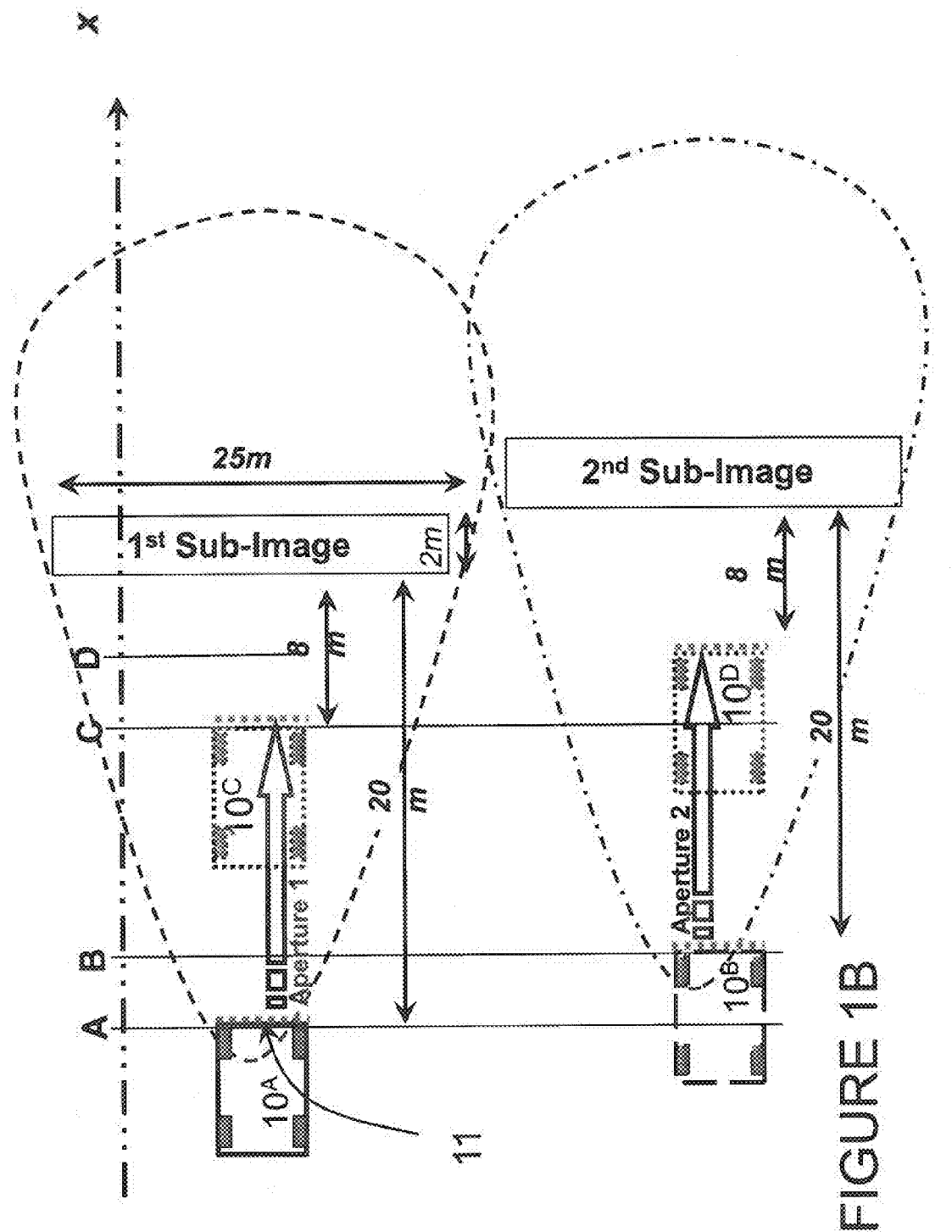
FIG. 1B is a schematic diagram of ultra wide band (UWB) forward looking radar imaging geometry and mosaic imaging.
Figure 2:
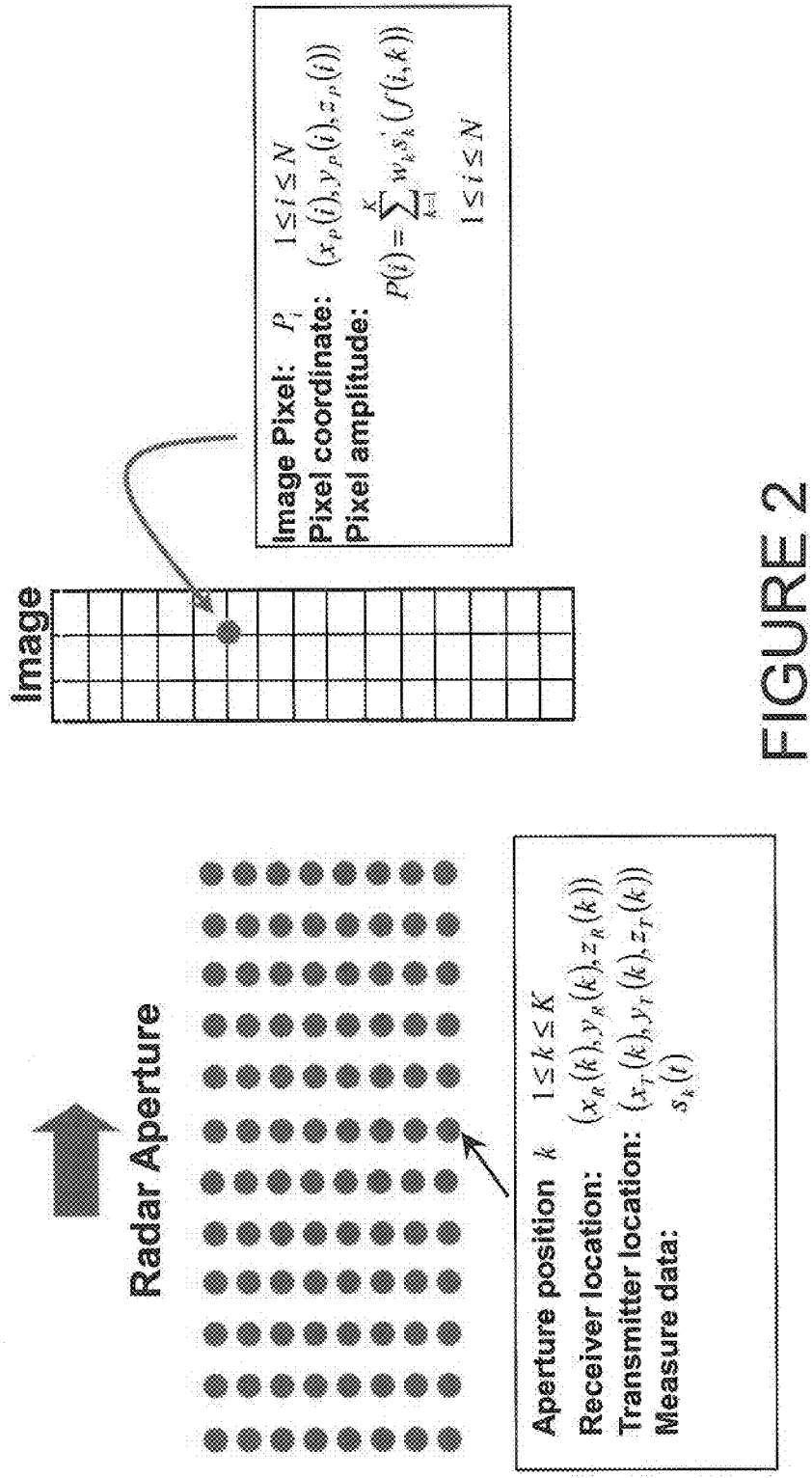
FIG. 2 illustrates the back-projection image formation being applied to each sub-image.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should hot be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower", side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Disclosed in U.S. Pat. No. 7,796,826 ('826 patent) is a non-linear imaging algorithm that significantly improves the background noise level of the resulting image (FIG. 4) without negatively affecting the focus quality (sharpness) as well as the target amplitudes. In the '826 patent, this technique has been denominated as Recursive Sidelobe. Minimization (RSM).

Recursive Sidelobe Minimization (RSM)

Figure 5:
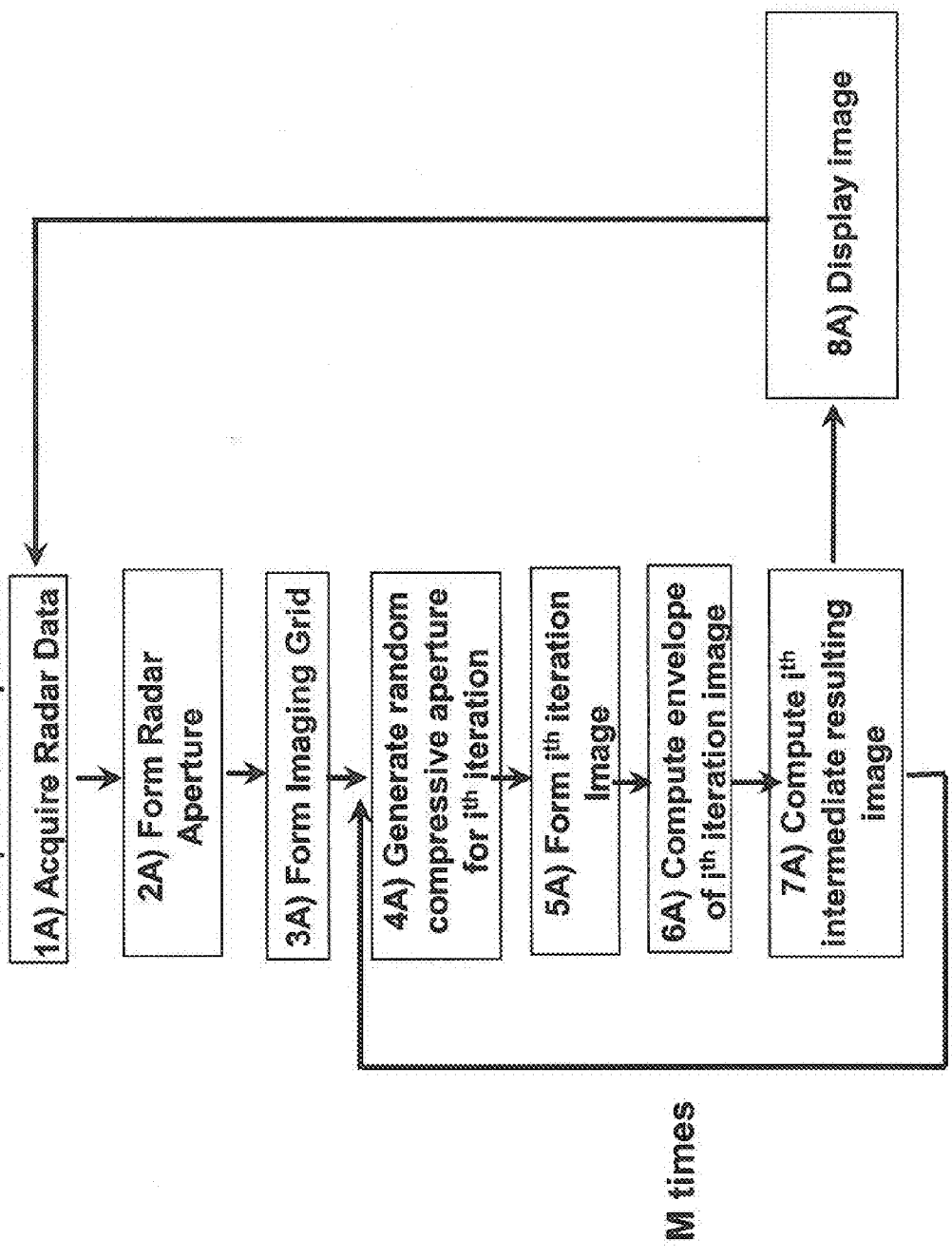
FIG. 5 is an flow chart representation of an embodiment utilizing a Recursive Sidelobe Minimization (RSM) Technique using multiple compressive apertures

As depicted FIG. 5, radar data is collected from a number of positions. For each position, radar data and the positional data are recorded. A "data point" represents the received signal radar data from each position obtained during an instant or interval in time combined with positional information corresponding to the transmitting and/or receiving position or location. The data points may be collected by either an array of elements or a single moving element which receives data at points in time, or the combination of both; e.g., a physical array of elements with the elements moving over increments of time. The data collection may be sporadic or at specific intervals of time. As exemplified in FIG. 6, data points are obtained using an array of receiving elements which receive data incrementally. The data points are arranged to form an aperture. As used herein, the term "aperture" means the information or data components used to form an image; which may be for example, an array of data points developed from a scanned area, target or scene which can be used to form an image. In the apertures depicted in FIG. 6, each column represents an interval during which the 1-k elements receive data; each data point representing the image data from the signal received combined with the coordinates of the receiving element. After the data points are established in an aperture (or array), as diagrammatically shown in FIG. 6, a substantial portion of data points are removed from the original aperture (array of data points) to form a "subarray." Conversely, the "subarray" may be formed by the selection of data points within the original aperture. Depending upon the quality of the result desired and the nature of the image being undertaken, the substantial portion of the data points removed or selected may range from as little as one percent to ninety percent. However, one percent removal will result in negligible difference and ninety percent removal will result in drastic reduction of image quality. In general, it is preferred that the percentage of data points subject to removal be within a range of approximately twenty to fifty percent. Using the remaining data points in the aperture, a first preliminary image is formed. During a second interval, the process of removing a different set of twenty to fifty percent of the data points within the original aperture is repeated and a second aperture is formed. In a preferred embodiment, the data points subject to removal are randomly chosen. However, random selection is not necessary to practice the principles of the present invention and some other arbitrary or contrived selection process may be used.

A second preliminary image is formed from the second aperture following the removal of a different set of data points. The first and second preliminary images are then compared. Using the principles of the present invention, the magnitude of the signal at each bit-mapped location of the preliminary images is compared. Any pixel having a greater or equal value is discarded, and only the lesser value is used for each bit-mapped location in the merged image. For each subsequent iteration, approximately twenty to fifty percent of the data points are removed to form an aperture and the preliminary image developed therefrom is compared with the previously merged image. The magnitude of the signal at each pixel or bit mapped location is compared and only the lesser value is retained for each bitmapped location in the combined image. This process is repeated iteratively over a series of iterations, which may be for example ten to several hundred iterations. The result is the substantial elimination of noise from the resulting merged image.

Although the technique is implemented and demonstrated for the ultra wide band forward-looking imaging radar (e.g., ARL SIRE), the technique is suitable for used for other image radar as well. The technique may also be applied for the BoomSAR radar, which is a different radar with different configuration (side-looking). Moreover, this imaging technique is not limited to the formation of radar images as it can be applied to other applications such as CAT scans, magnetic resonance, seismic, sonar, and acoustic imaging.

Use of the Recursive Sidelobe Minimization (RSM) technique results in an improvement of image contrast by reducing system noise by a significant level, significantly improving system performance; and can be adapted for use with existing radar systems. Results include the generation of high contrast images produced by significantly reducing the noise level in the system such that very difficult targets or objects (with low amplitudes) in the image can be detected, which otherwise would be embedded in the system noise.

Generally speaking, in any imaging system, the sidelobes from large objects or noisy spots generated by the system may be mistaken as targets of interest. In accordance with the principles of the present invention, the large sidelobes are substantially virtually eliminated, thus reducing the false alarm objects that would be considered as targets of interest.

Possible uses other than radar imaging include magnetic resonance imaging, CAT scan, sonar imaging, and acoustic imaging.

Figure 3:
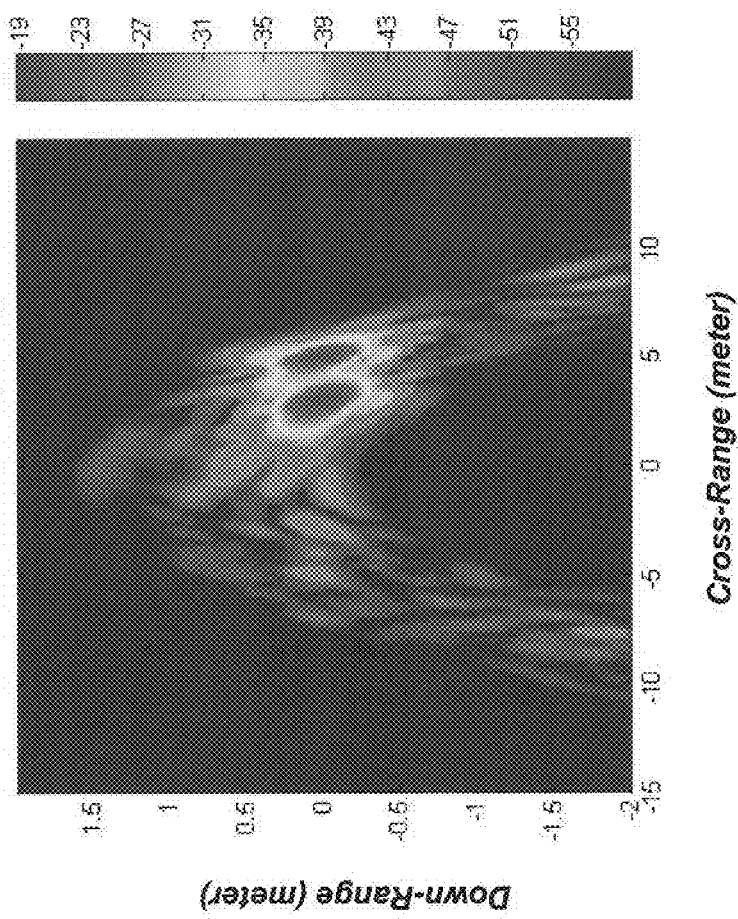
FIG. 3 illustrates a SAR image of two simulated point targets formed using a baseline algorithm for comparison purposes.
Figure 4:
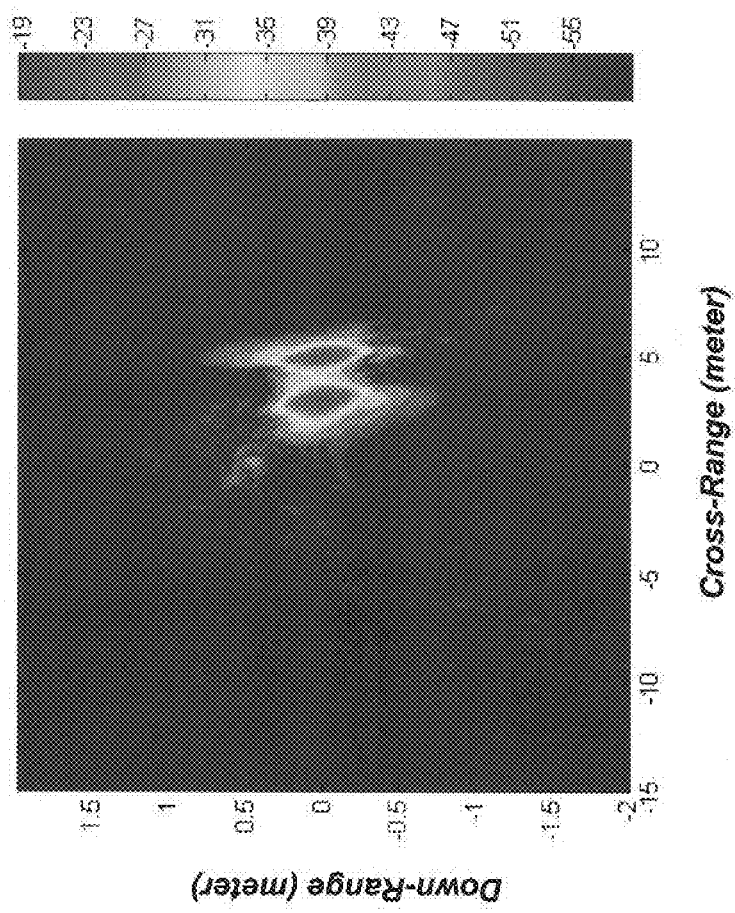
FIG. 4 illustrates the same SAR image of two simulated point targets formed using a preferred embodiment technique of the present invention.

FIG. 4 shows the SAR image for the same area as FIG. 3, except that this image is processed using the algorithm disclosed in the '829 patent. FIG. 4 is displayed using the same dynamic range (40 dB) as FIG. 3 for comparison purposes. It is obvious from viewing the images presented in FIGS. 3 and 4 that the noise floor in the resulting images is significantly reduced. The sidelobe level in the resulting image shown in FIG. 4 is reduced by 13.5 dB from that shown in FIG. 3.

Recursive Sidelobe Minimization Using Compressive Aperture

FIG. 5 shows a preferred embodiment flow chart of the Recursive Sidelobe Minimization (RSM) technique using a compressive aperture which significantly reduces the multiplicative noise in the process of forming a SAR image. As used herein, the term "compressive aperture" refers to an aperture after randomly or arbitrarily selected data points have been removed. FIG. 5 illustrates the following steps:

Step 1A—Radar data and its position information is acquired.

Step 2A—The radar aperture is formed in preparation for image formation. The aperture consists of K elements. Each element in the radar aperture includes the radar receiving position information $(x_R(k), y_R(k), z_R(k))$, the radar transmitting information $(x_T(k), y_T(k), z_T(k))$, and the data record $s_k(t)$ that the radar measures at this location. For side-looking radar, the aperture is usually a linear path with data measured along the path. For the forward-looking radar mentioned above, a 2D radar aperture is generated; formed by the physical antenna array and the forward motion of the radar.

Although the terminology "2D" or two dimensional is used to reflect the aperture configuration, the data within the 2D aperture may contain three dimensional information concerning the target area in that the signal data may include the distance at which the target is located relative to the receiving element. In general, the radar aperture may take any of a variety of shapes and those shown are merely examples.

Step 3A—The imaging grid is formed. In a preferred embodiment a rectangular imaging grid is generated although the imaging grid could be arbitrary defined. Each pixel $P_i$ in the imaging grid is located at coordinate $(x_P(i), y_P(i), z_P(i))$.

Step 4A—A random compressive aperture is generated using the radar aperture with K elements from step 2A. The compressive aperture is formed by selecting only L elements from the original aperture for the imaging process. The value for L is $$L = p \cdot K. \text{ Where } 0 < p < 1 \quad (6).$$

Accordingly, only a subset of the aperture positions are used for image formation. The remaining K−L aperture positions are simply discarded for this realization. The typical number that we use for our configuration is p=0.8 (i.e., 80% of the aperture is employed and 20% of the aperture is discarded at each iteration). The value of p that can achieve best result should be examined and optimized for each configuration of geometry and radar data set. In a preferred embodiment, the selection of L aperture positions is completely random for each realization. If $A_l$ represents a vector that contains the indices of aperture positions to be included in the image formation process for $l^{th}$ realization, then:

$$A_l = \langle \alpha_{l1}, \alpha_{l2}, \ldots, \alpha_{lL} \rangle \quad (7)$$

where $\alpha_{lm}$, is a random number, $1 \leq \alpha_{lm} \leq K$ and
$\alpha_{lm} \neq \alpha_{ln}$ for $m \neq n$. (8)

The technique disclosed in the '829 patent may use, a random number generator that produces random numbers with certain distribution. Those of ordinary skill in the art would readily appreciate that there are Many types of distributions. The two distributions that are widely employed in practice are uniform (in which all values from a finite set of possible values are equally probable) and Gaussian (in which all values from a finite set of possible values follow the Gaussian distribution that has the shape of a bell curve). Although any random number distribution could be used to realize (7) and (8), a uniform distribution random number generator may be employed in this preferred embodiment. There are many different implementations for generating a uniformly distributed random numbers for use in conjunction with the present invention; including those random number generator routines that are usually defined and included in general purpose computer programming languages. For example, in C programming language the two routines srand( ) and rand( ) are used to generate a random number. First, the srand( ) routine is called to initialize the random number generator. Next, the rand( ) routine is called to generate a random number between 0 and a predefined value RAND_MAX. The following code fragment (C language) demonstrates how to generate 100 uniformly distributed numbers that have values from 0 to M=1000.

```
seed=9000;   /* choose a seed value */
srand(seed);  /* initialize random number generator */
M=1000;      /* initialize value of M */
For (i=1; i<100; i++)
{
```

-continued

```
/* random1 is a floating-point number from 0 to 1 (not including 1) */
random1 = ( (double)rand( )/((double)(RAND_MAX)+(double)(1));
/* random2 is a floating-point number from 0 to M (not including M) */
random2=(double)M* random_1;
/* random3 is an integer number from 1 to M (including M) */
random3=(int)random2+1;
}
```

To generate the vector of random number $A_l$ as described in (7) and (8), one can use the random number generator as shown in the above code fragment example. Each time a random number is generated, it is compared to the previous ones to ensure that all elements in $A_l$ are unique as specified in (8). Otherwise, another random number is generated to satisfy (8).

It can be readily appreciated by those of ordinary skill in the art that the term "random numbers" as used herein includes numbers generated selectively or arbitrarily. As shown in the foregoing, the selection process may be one of those commonly associated with computer programming, but other number selection processes or arbitrary number selection processes may be utilized to achieve the same or similar results without departing from the principles of the present invention.

Figure 6:
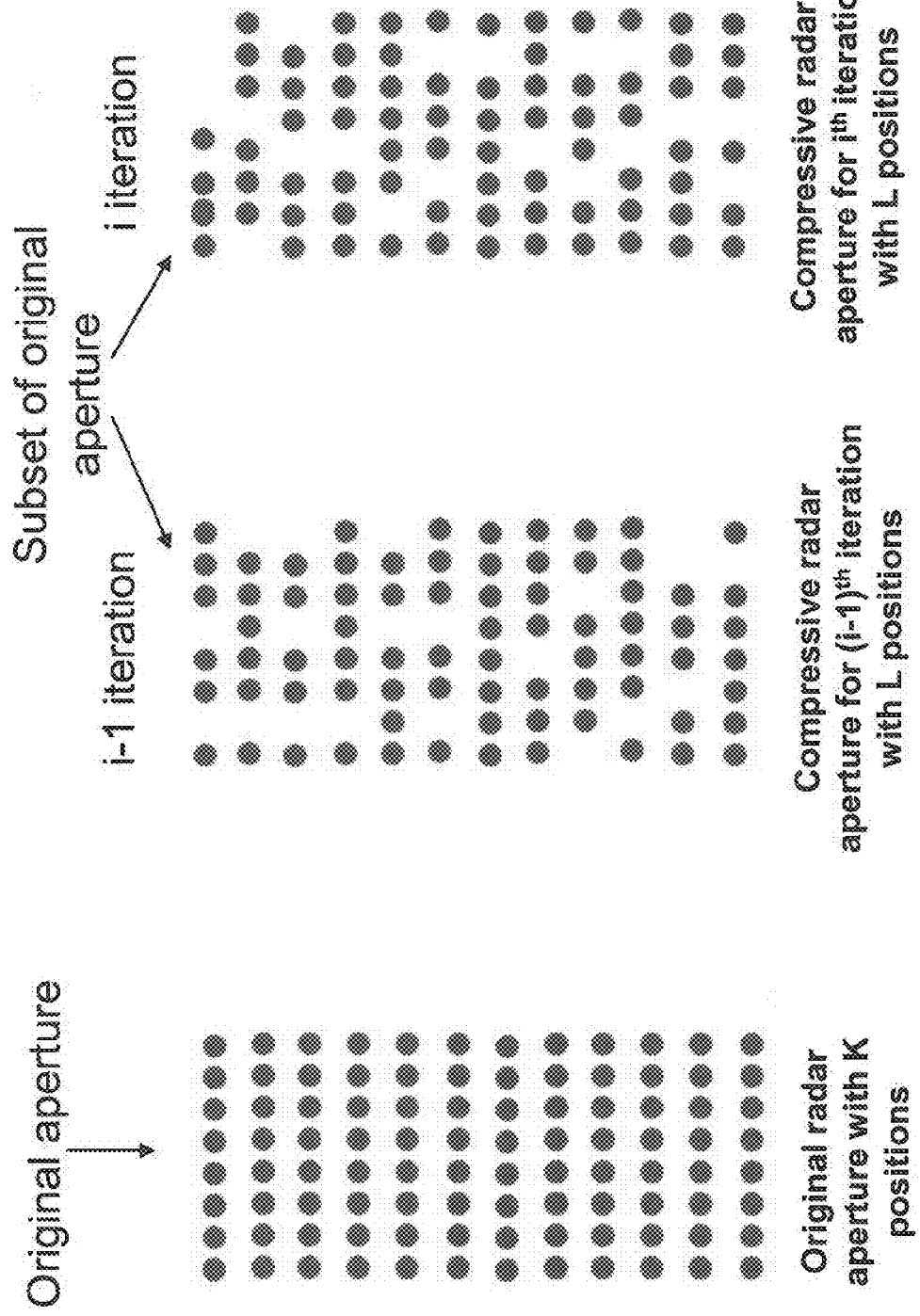
FIG. 6 is an illustration of the generation of a subset of radar aperture for each iteration.

FIG. 6 illustrates the original radar aperture and two compressive apertures generated at two different iterations. Each compressive aperture is a subset of the original aperture with gaps (deleted data points) introduced. Since the locations of the gaps in a preferred embodiment are randomly generated, the compressive aperture from $(l-1)^{th}$ iteration is different than the compressive aperture from $(l)^{th}$ iteration. In this preferred embodiment, the randomness of the gap locations is an important feature that enables performance improvement.

Generally speaking, it is not intuitive as to why only a subset of the original radar aperture is used instead of the full aperture for forming image, since gaps introduced in the subset of an aperture would seem to result in inferior performance. In prior art conventional techniques, one generally prefers the full data set and avoids the gapped data set. However, the benefit of this "subset" approach will be examined later in conjunction with step 7A below.

Step 5A—The image is formed using the compressive aperture generated from step 4A. The compressive aperture derived from $A_l$ with L elements is then used to form the $l^{th}$ realization of the sub-image using the backprojection method as described above.

This results in the $l^{th}$ realization of the sub-image with I pixels in the down-range direction and J pixels in the cross-range direction, where N=I·J $$I_l = \langle P_l(i) \rangle, 1 \leq i \leq N, \quad (9)$$

where $P_l(i)$ is computed using equation (1) with modification, reproduced below:

$$P(i) = \sum_{k \in A_l} w_k s'_k(f(i,k)) \quad (1b)$$

Note that in the summation, the values of index k are selected from the random vector $A_l$ defined in (7).

Step 6A—The envelope of the image generated in step 5A is computed. The image generated in step 5A can also be written as:

$$I_l = \langle P_{lj}(i) \rangle, 1 \leq i \leq I, 1 \leq j \leq J \quad (10)$$

where $P_{lj}$ is the $j^{th}$ down-range profile from the $l^{th}$ realization sub-image.

The corresponding quadrature component of this image down-range profile is computed by applying the Hilbert transform filter to the in-phase component $$PH_{lj} = \text{Hilbert}(PH_{lj}) \tag{11}$$

The Hilbert transform filter has magnitude 1 at all frequencies and introduces a phase shift of $$-\frac{\pi}{2}$$

for positive frequencies and $$+\frac{\pi}{2}$$

for negative frequencies. Thus, the Hilbert transform filter is used to shift the real signal (each image down-range profile) by $$\frac{\pi}{2}$$

to generate its quadrature component in order to compute its envelope.

As disclosed in the '829 patent, in one preferred embodiment using the Hilbert transform filter, the envelope of the $j^{th}$ down-range profile from the $l^{th}$ realization of the image may be computed as $$PE_{lj} = \sqrt{(P_{lj})^2 + (PH_{lj})^2}. \text{ (where the subscript is } ij) \tag{12}$$

The envelope of this image is simply $$I_l = \langle PE_{lj}(i) \rangle, \ 1 \le i \le I, \ 1 \le j \le J. \tag{13}$$

Figure 7:
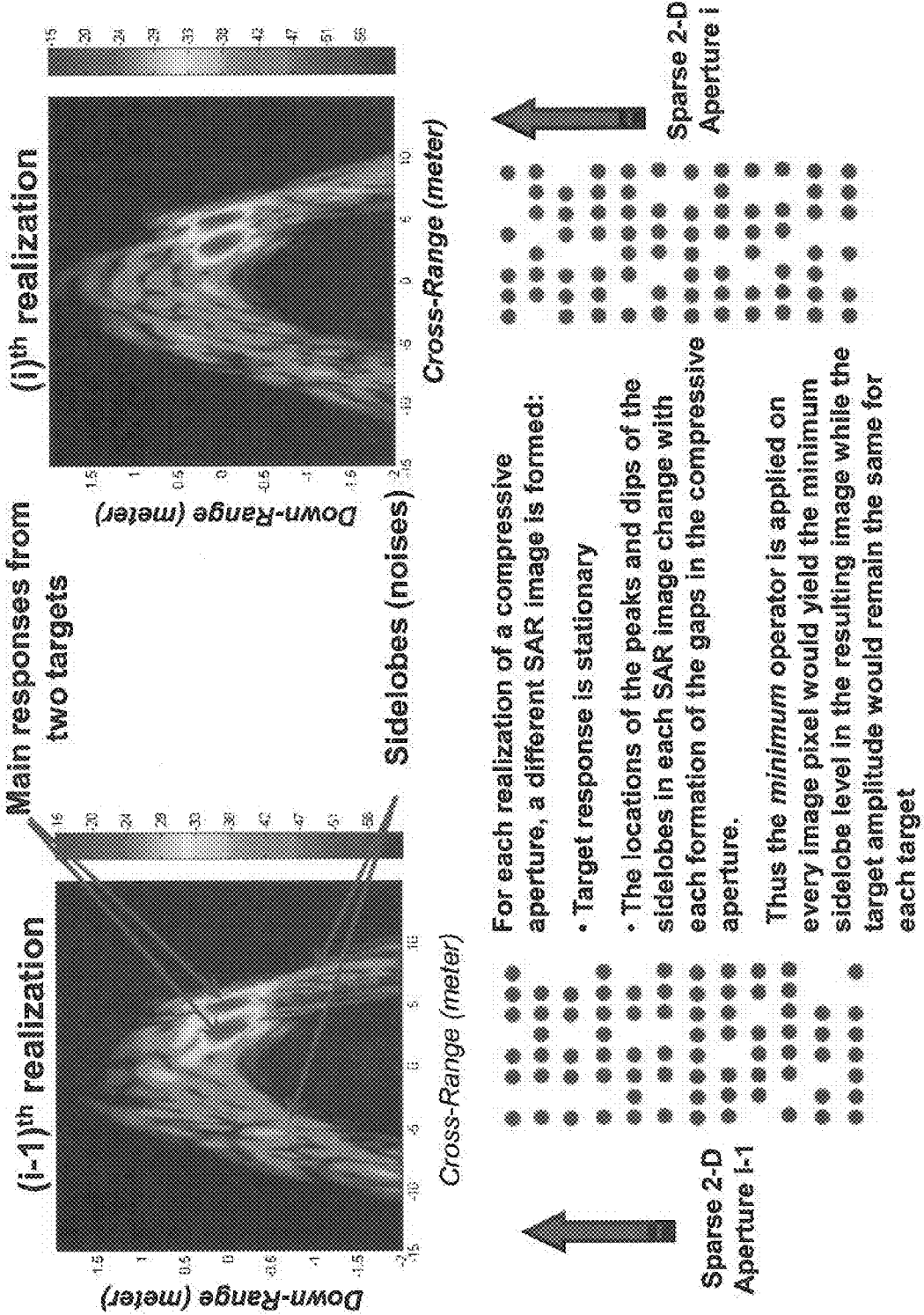
FIG. 7 is an illustration of the generation of subsets from an original radar aperture for each iteration (i−1 and i) and the realization therefrom.

FIG. 7 shows an example of an image formed from the $(l-1)^{th}$ iteration (left) and another image is form at $(l)^{th}$ iteration (right). Each image shows the main responses from the two point targets, which may not be well-focused. The energy from the two main lobes spread throughout the image. In this simulation, there are two main factors that result in severe sidelobes. First, the width of the radar aperture is small compared to the image area. Second, radar position measurement system was limited accuracy, thereby introducing errors in the radar position data. In practice, there may be many factors that contribute to the sidelobe level (and thus the noise, floor) in the resulting image.

Step 7A—An intermediate resulting image is computed. The minimum operator is applied to two images: 1) the intermediate result from previous iteration $(l-1)^{th}$ and 2) the image formed from this iteration. For each image pixel, the values of the two images are compared and the minimum value is selected $$\text{Im}_l = \min\langle I_l, \text{Im}_{l-1}\rangle, \ 2 \le l \le M \tag{14}$$

where $\text{Im}_l$ is the intermediate resulting image at $(i)^{th}$ iteration. Note that equation (14) is defined for $2 \le l \le M$. For the first iteration (l=1), $\text{Im}_0$ is initialized with a very large values, so that the intermediate resulting image $\text{Im}_l = \min\langle I_l, \text{Im}_0\rangle \le I_l$.

Figure 8:
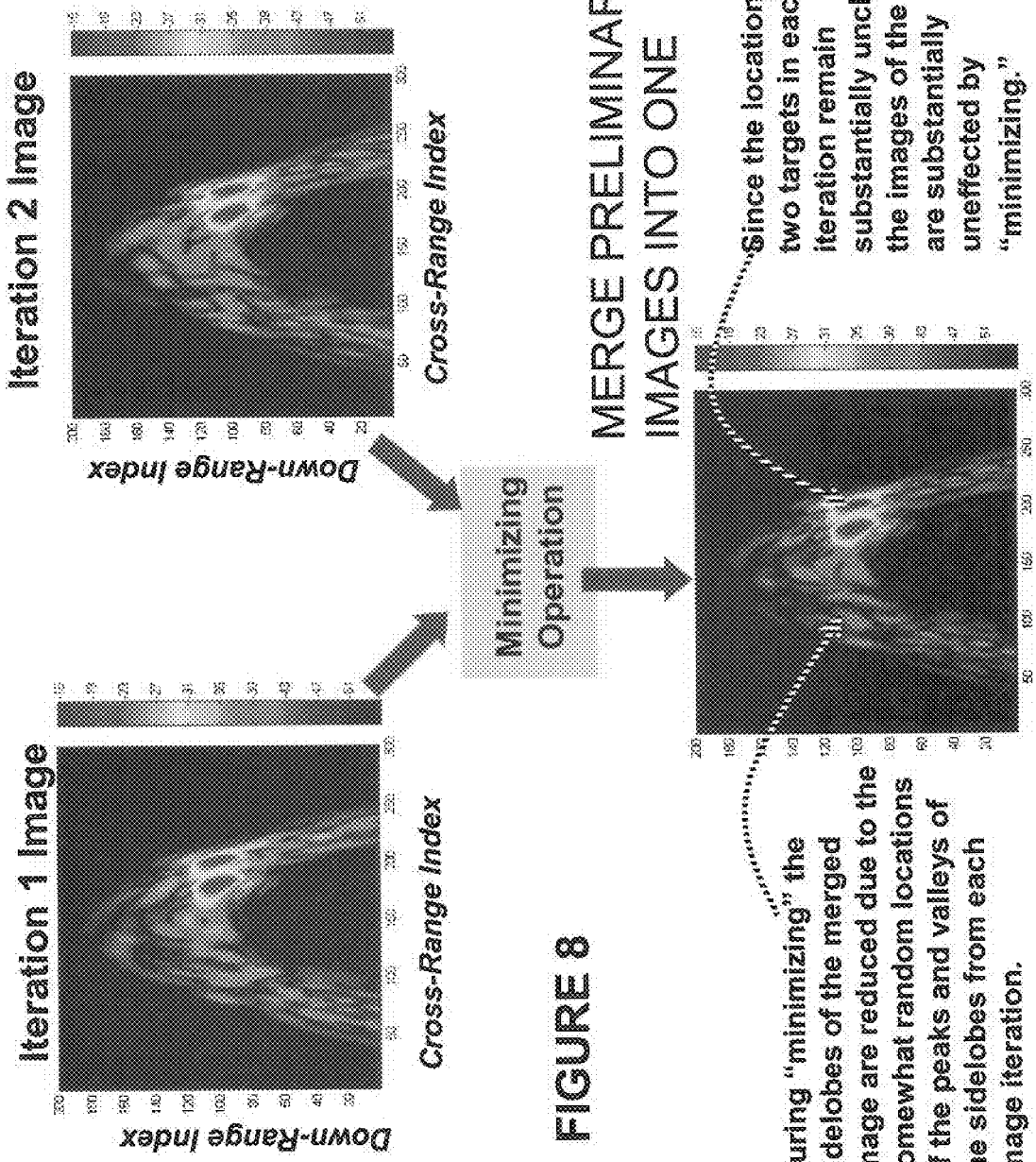
FIG. 8 is an illustration of the combination of two images (or merging) using a minimizing operation to provide an improved result.

FIG. 8 illustrates an example as to how this technique reduces the noise (sidelobes) in an image. FIG. 8 shows two images formed using two different compressive apertures. The sidelobes of the two images are different in amplitude. More importantly, the locations of the peaks and dips of the sidelobes in the two images are also different. The differences in the sidelobes of the two images are due to the different gap patterns from the two corresponding compressive apertures. On the other hand, the amplitudes of the target responses from the two images are the same, and the locations of these responses are somewhat stationary. Therefore, when a minimum operation is applied on the two images, the target responses remain unchanged in the resulting image, but the sidelobes are generally lower than either input image. As seen from the image at the bottom of FIG. 8, the sidelobe level of the resulting image is improved (lower) compared to the two input images.

Figure 9:
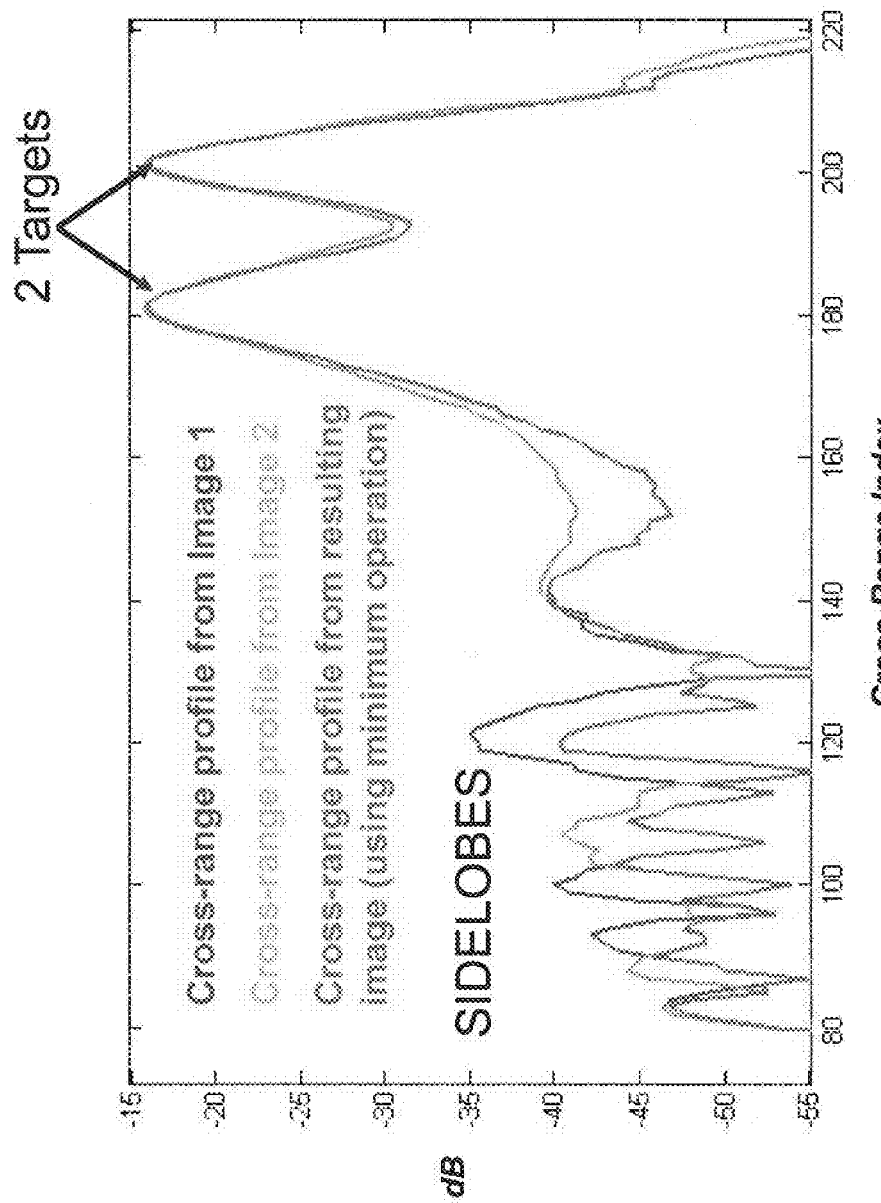
FIG. 9 is a graphical illustration showing a comparison of cross-range profiles showing the sidelobes and main lobe signals versus cross range indices.

Another performance comparison is shown in FIG. 9, wherein the cross-range profile (horizontal cut) through each image (two input images and one resulting image) is displayed to compare the sidelobe level and the target response from each image. Again, it can be appreciated that the target responses remain substantially the same while the sidelobe level of the resulting image is better (lower) than either input image. By repeating this process for many compressive apertures, the sidelobe level in the resulting image continues to improve (lower) while the target responses remain substantially unchanged.

Figure 10:
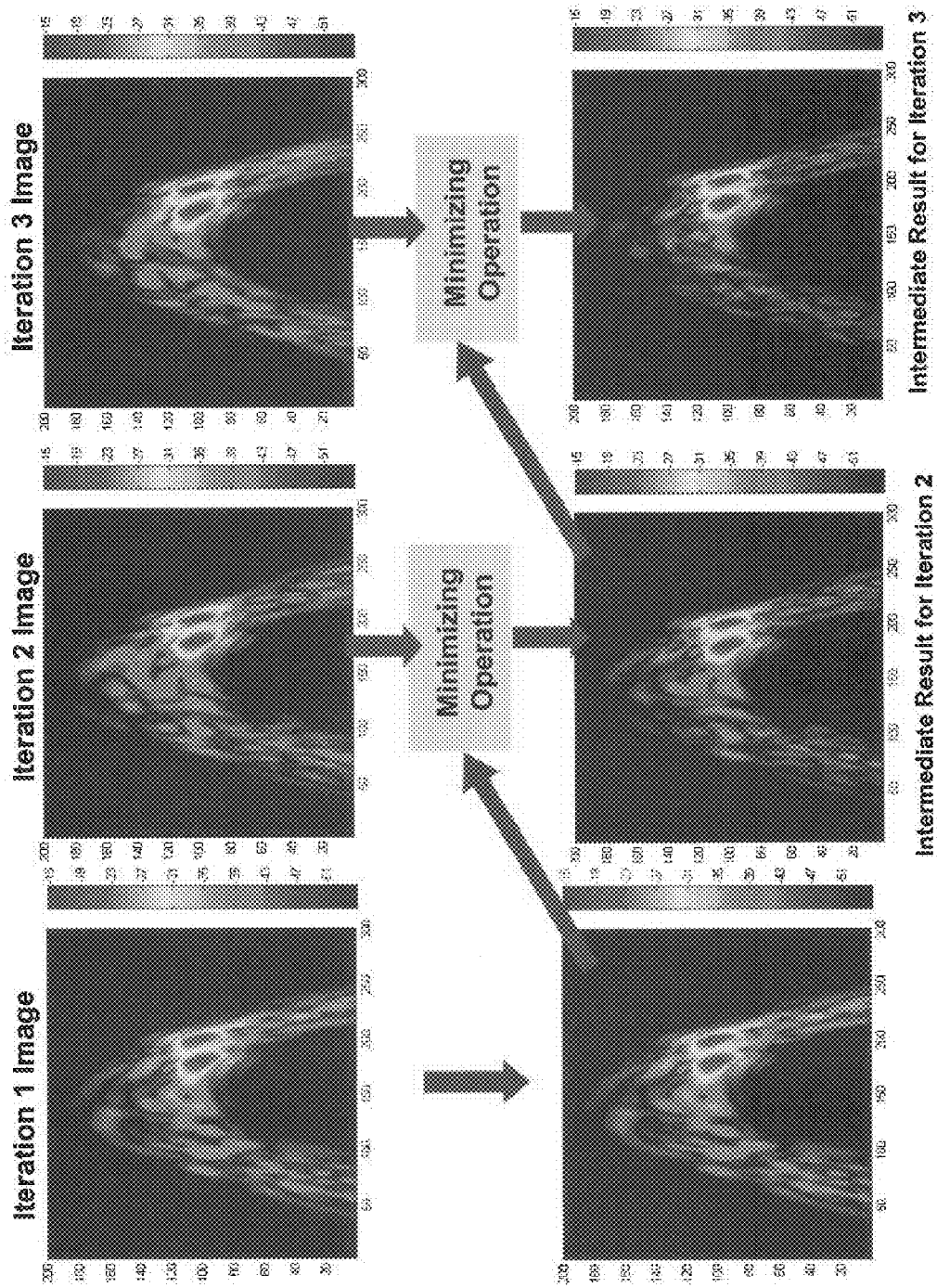
FIG. 10 illustrates compressive images and intermediate resulting images in three iterations.

After step 7A, the algorithm returns to step 4A to continue with the next iteration until the $M^{th}$ iteration is finished. The intermediate resulting image is also sent to the display routine for visualizing the image. FIG. 10 illustrates the compressive image and the intermediate resulting image generated in the first, three iterations. FIG. 11 shows the results at various iterations. In the resulting image at iteration 50, the sidelobes are significantly suppressed while the responses of the two targets remained unchanged.

FIG. 9 is a graphical illustration showing a comparison of cross-range profiles which represent two preliminary images that are compared using the "minimizing" technique and merged into a resulting image. As graphically presented in FIG. 9, the amplitudes of the resulting two targets remain the same after the "minimizing" operation and the locations of the targets do not change. However, when the sidelobes of the resulting image are compared at various points and the lower value is selected, for each iteration the resulting image contains a profile less than the preceding iteration. That is, the sidelobes of images 1 and 2 are diminished during the "minimizing" (i.e. selection of the minimum) step due to the random location of the peaks and dips of the sidelobes from each image, while the waveforms representing the two targets remain substantially unaffected.

FIG. 10 is a comparison of images of two targets generated after a series of three iterations using the principles of the present invention. FIG. 11 is a similar comparison of images of two targets after a more lengthy series of iterations (e.g. 1, 2, 3, 8, 20 and 50 iterations). The number of iterations shown and the choice of percentage of data points removed are merely exemplary and may vary depending upon the time and resources available, the quality desired and the nature of the target area.

FIG. 11a is a further illustration showing the effect of how changing the percentage of data points which are removed from the apertures affects the image.

Figure 13:
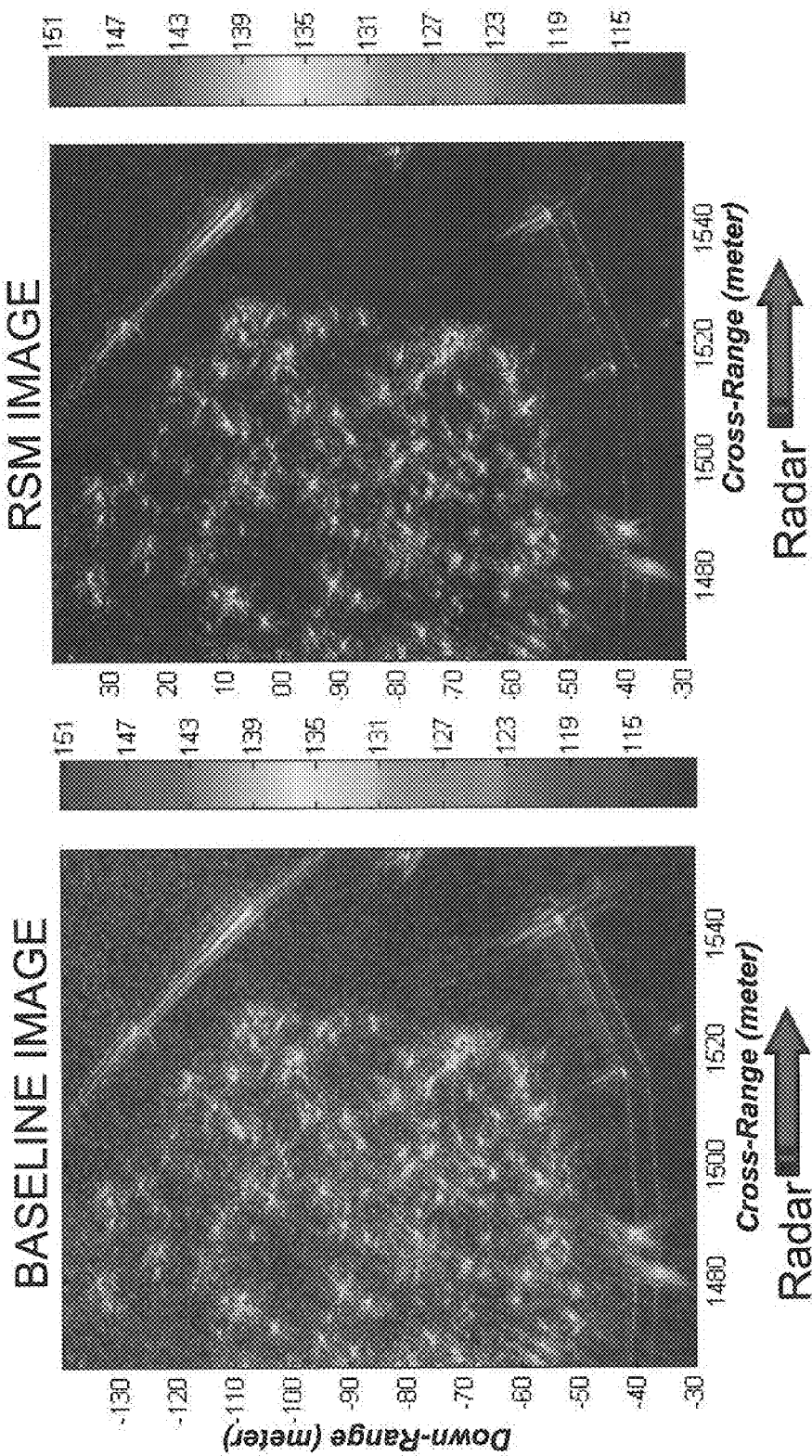
FIG. 13 is an illustration of recursive sidelobe minimization technique using data from ARL BoomSAR radar with a different geometry (side-looking mode) and different configuration.

Although in the '829 patent, the application of the RSM technique for a preferred embodiment configuration (a UWB radar configured in forward-looking imaging mode), this RSM method could be applied to any coherent imaging system where measurements from an aperture of arbitrary geometry (linear, curve, 2-D, or 3-D) are coherently integrated to form a 2D or 3D image. FIG. 12 shows the "before" and "after" images when the RSM technique is applied to the SIRE radar data in forward-looking configuration. FIG. 13 illustrates a comparison of a baseline image (left) with an image (right) from a Recursive Sidelobe Minimization (RSM) preferred embodiment technique using data from another radar (e.g., BoomSAR) with a different geometry (side-looking SAR) and a single transmit antenna and single receive antenna in a pseudo-monostatic configuration.

The '829 patent includes a code listing representative of the RSM algorithm in Appendix A.

Image Formation by Pixel Classification (Based upon Variation of Pixels over Iteration Process)

Figure 15:
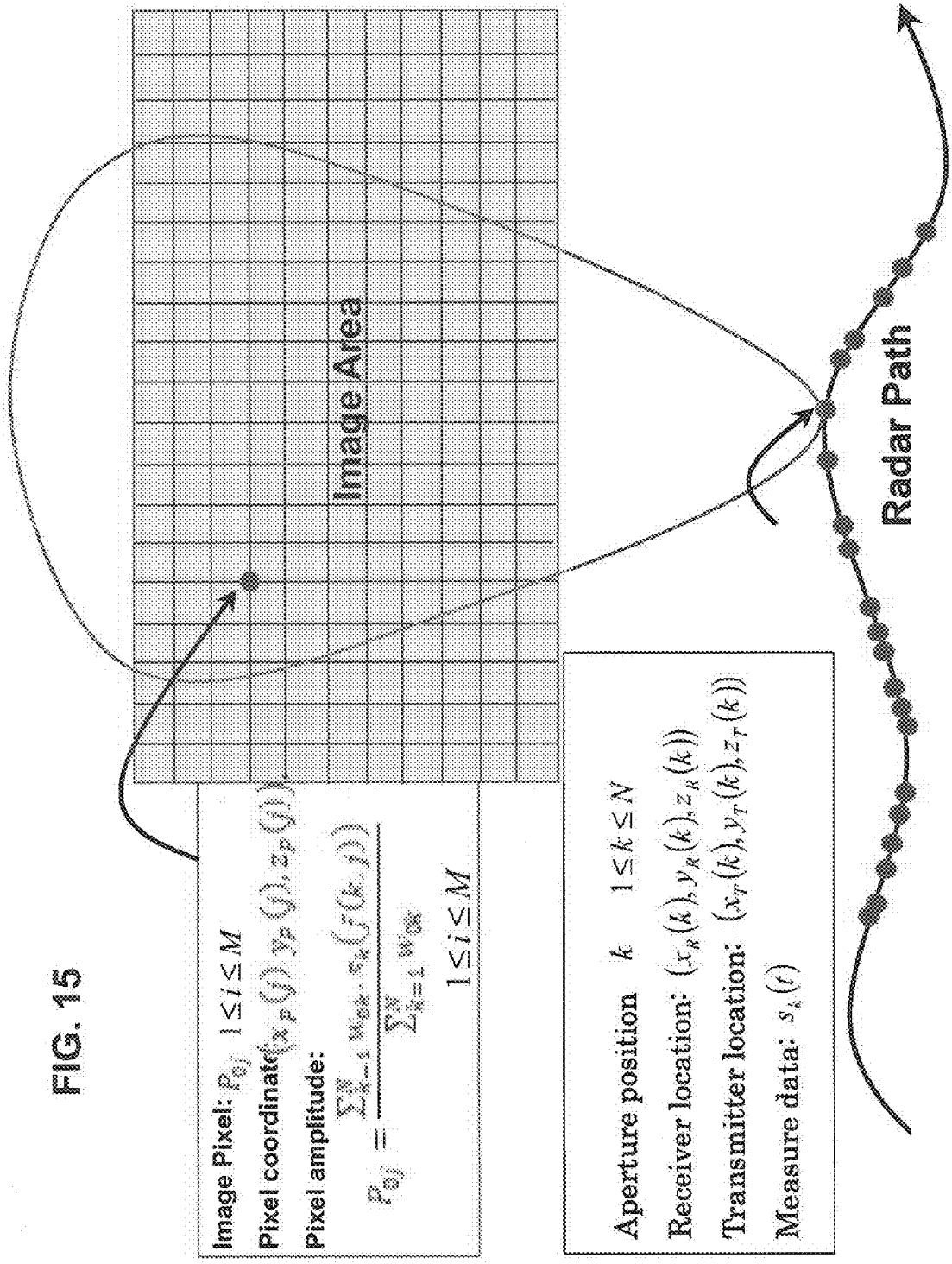
FIG. 15 is a depiction of an imaging scenario derived, for example, from a radar mounted on a vehicle (ground-based or airborne) and as the radar moves along a path, the radar transmits signals to illuminate the area of interest located on the side of the radar, captures the return radar data and its position data, and combines the data to form the SAR image of the area.
Figure 16:
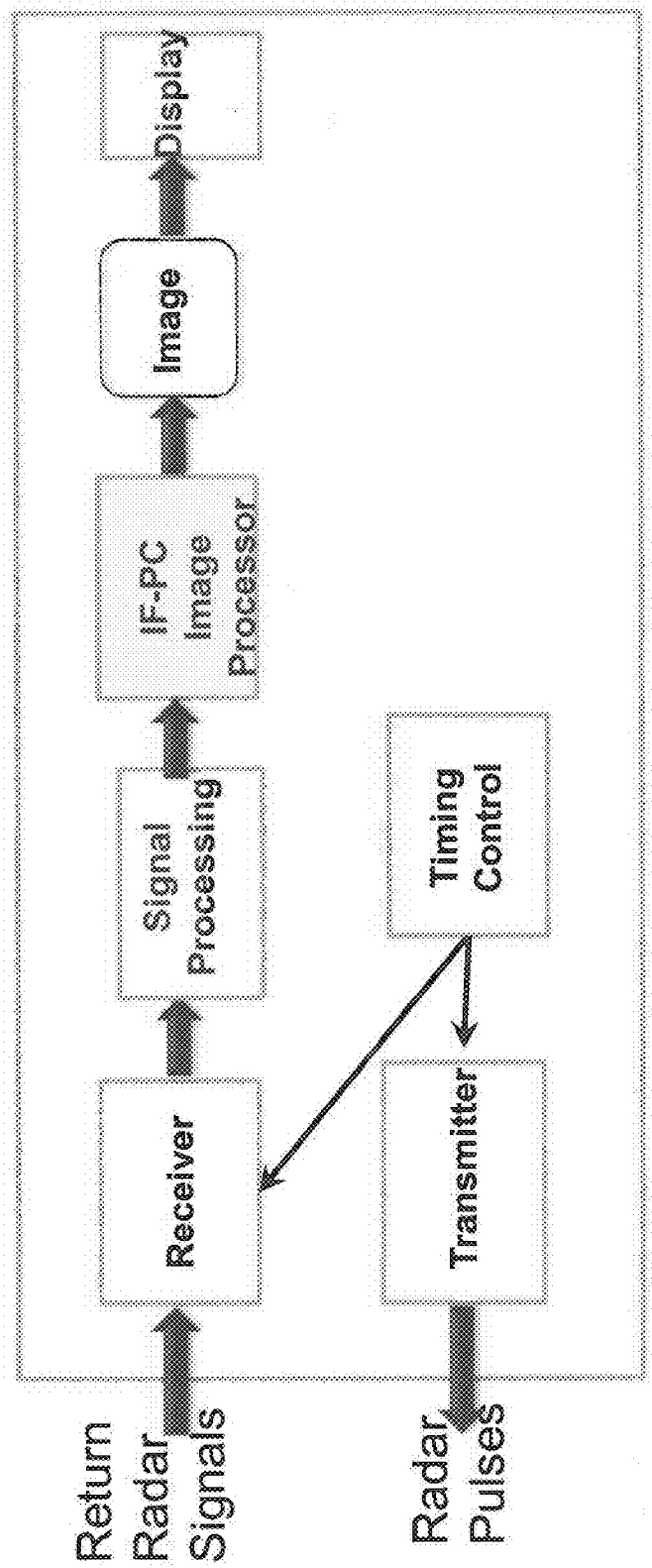
FIG. 16 illustrates an overall SAR system block diagram of an embodiment.
Figure 17:
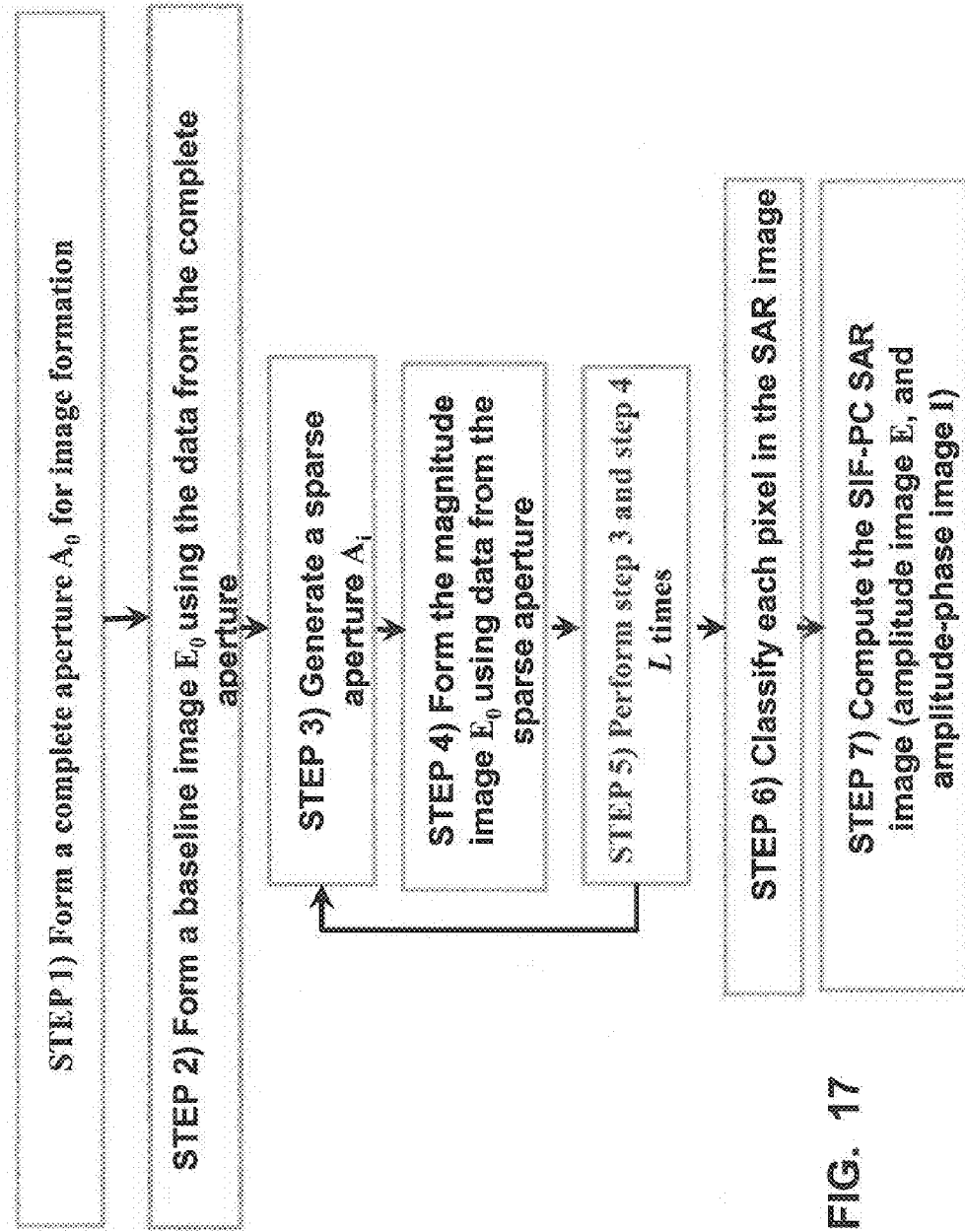
FIG. 17 illustrates the processing steps of a pixel characterization technique.

FIG. 15 shows an imaging scenario. The radar is mounted on a vehicle (ground-based or airborne). The radar moves along a path that is formed while the vehicle is moving. Along the vehicle path, the radar transmits signals to illuminate the area of interest located on the side of the radar, captures the return radar data and its position data, and combines the data to form the SAR image of the area. Although FIG. 15 illustrates the radar system that is configured in side-looking mode, the concept of operation is the same for the forward-looking mode. An article by one of the coinventors, Lam Nguyen, "Signal and Image Processing Algorithms for the U.S. Army Research Laboratory Ultra-wideband (UWB) Synchronous Impulse Reconstruction (SIRE) Radar," ARL Technical Report ARL-TR-4784, April 2009 (hereby incorporated by reference) describes the ARL radar operations and processing steps in both side-looking mode and forward-looking mode. FIG. 16 shows the overall SAR system block diagram of a preferred embodiment of the present invention. The return radar signals are first, sent to the signal processing subsystem, where a series of signal processing algorithms are performed to suppress much of the additive noise from the radar data as described further in Lam Nguyen, "Signal and Image Processing Algorithms for the U.S. Army Research Laboratory Ultra-wideband (UWB) Synchronous Impulse Reconstruction (SIRE) Radar," ARL Technical Report ARL-TR-4784, April 2009, hereby incorporated by reference. After the signal processing steps, the processed radar data are sent to the IF-PC imaging subsystem that combines the radar and the position data to form the SAR imagery. The image formation process typically employs standard imaging techniques such as the back-projection algorithm, as described in the publication. John McCorkle, Lam Nguyen, "Focusing of Dispersive Targets Using Synthetic Aperture Radar," original ARL-TR-305 August 1994, reprinted March 2010, hereby incorporated by reference, or the range migration algorithm R. H. Stolt, "Migration by Fourier Transform," Geophysics, Vol. 43, No. 1, February 1978, p. 23-48, hereby incorporated by reference. As mentioned in the previous section, although the signal processing steps have performed the suppression of unwanted noise from the return radar data, and the imaging process also provides additional signal-to-noise gain by coherently integrate radar data from many aperture positions, the noise floor in the resulting image is still a major challenge for the detection of smaller targets, especially if these targets are located in the proximity of the sidelobes of the larger objects. We invented an imaging technique (IF-PC) to generate almost noise-free SAR imagery. FIG. 17 shows the processing steps of the IF pixel characterization technique that may be performed by a SAR imaging subsystem.

With reference to FIG. 17, in step 1 the complete aperture $A_0$ for SAR image formation informed. In this step, the system collects the return radar data, the coordinates of the receiver, and the coordinates of the transmitter for each position k along the aperture of N positions.

The radar data at each position is $$s_k(t), 1 \leq k \leq N \tag{1}$$

The coordinates of the receiver at each position is $$(x_n(k), y_n(k), z_n(k)), 1 \leq k \leq N \tag{2}$$

The coordinates of the transmitter at each position is $$(x_T(k), y_T(k), z_T(k)), 1 \leq k \leq N \tag{3}$$

For monostatic radar that uses the same transmitting and receiving antenna, the coordinates of the receivers ($x_R(k)$, $y_R(k)$, $z_R(k)$) are identical to the coordinates of the transmitters ($x_T(k)$, $y_T(k)$, $z_T(k)$). Since the monostatic radar case is a special case of the bistatic radar configuration, the algorithm described here is applicable for both configurations.

The next step in FIG. 17 is to form a baseline image using data from Aperture $A_0$ generated from step 1 using the standard backprojection algorithm [6]. In order to form an image from the area of interest, we generate an imaging grid that consists of image pixels.

Each pixel from the imaging grid is located at coordinates $$(x_P(j), y_P(j), z_P(j)), 1 \leq j \leq M. \tag{4}$$

The imaging grid is usually defined as a 2-D or 3-D rectangular shape. In general, however, the image grid could be arbitrary.

The backprojection value at $j^{th}$ pixel is computed as $$P_{0j} = \frac{\sum_{k=1}^{N} w_{0k} s_k(f(k,j))}{\sum_{k=1}^{N} w_{0k}}, \tag{5}$$

$$1 \leq j \leq M,$$

$P_{0j}$ is the value of $j^{th}$ pixel formed using the complete aperture $A_0$. In equation (5), by assigning the value of $w_{0k}$ to be either 0 or 1, the weighting factors $w_{0k}$ define which aperture positions contribute to the formed image. In this case, since we want to form an image using all of the N aperture positions of $A_0$, each weighting factor has the value of 1 as follows:

$$w_{0k}=1, 1 \leq k \leq N. \tag{6}$$

The delay (shift) index (f(k,j)) in equation (5) is computed based on the round-trip distance between the transmitting element, the image pixel, and the receiving element. The distance between the $k^{th}$ transmitting element and the $j^{th}$ image pixel is $$d_1(k,j)=\sqrt{[x_T(k)-x_P(j)]^2+[y_T(k)-y_P(j)]^2+[z_T(k)-z_P(j)]^2}. \tag{7}$$

The distance between the $k^{th}$ receiving element and the $j^{th}$ image pixel is $$d_2(k,j)=\sqrt{[x_R(k)-x_P(j)]^2+[y_R(k)-y_P(j)]^2+[z_R(k)-z_P(j)]^2} \tag{8}$$

The round trip distance is $$d(k,j)=d_1(k,j)+d_2(k,j) \tag{9}$$

The delay index is $$f(k,j) = \frac{d(k,j)}{c} \tag{10}$$

The baseline image using the data from the baseline (complete) aperture. $A_0$ is $$I_0 = \langle P_{0j} \rangle \tag{11}$$

The image $I_0$ is a bipolar (contains both positive and negative values) image that includes both amplitude and phase information. The corresponding envelope image $E_0$ is computed by computing the Hilbert envelope of $I_0$. The procedure to compute the envelope image is described in Nguyen, "Signal and Image Processing Algorithms for the U.S. Army Research Laboratory Ultra-wideband (UWB) Synchronous Impulse Reconstruction (SIRE) Radar," ARL Technical Report ARL-TR-4784, April 2009.

$$E_0 = |\text{Hilbert}(I_0)| \tag{12}$$

Referring again to FIG. 17, the third step comprises generating a spare aperture from the complete aperture of iv positions $A_0$ generated from the second step.

$$A_i, 1 \leq i \leq L \tag{13}$$

Where L is the number of iterations that the algorithm computes.

The sparse aperture $A_i$ is a subset of the complete aperture $A_0$. This sparse aperture only consists of K positions that are randomly selected from N positions in $A_0$, where K=p·N, and 0<p<1. The typical value for p=0.8. In this example the value of p=0.8 means that instead of using all of the positions from aperture $A_0$ for imaging, only 80% of the aperture positions are employed during the imaging process for this iteration. It is beneficial that the selection of K positions from N positions be completely random, since this step is only one out of L iterations that the preferred embodiment pixel characterization technique will perform, as will be explained later.

One approach to implement this sparse aperture is to generate a random vector for this $i^{th}$ iteration:

$$w_{ik}, 1 \leq k \leq N \tag{13}$$

where the value of $w_{ik}$ is either 0 or 1. There are K elements of $w_{ik}$ having the value of 1, and (N−K) elements of $w_{ik}$ it having the value of 0.

Referring again to FIG. 17, the fourth step comprises forming the magnitude image $E_i$ using data from the sparse aperture $A_i$ (from step 3) and the backprojection algorithm (described in step 2).

First, the bipolar image using the data from the sparse aperture is computed as:

$$I_i = \langle P_{ij} \rangle \tag{14}$$

From equation (5), the backprojection value at $j^{th}$ pixel using the sparse aperture $A_i$ is computed as $$P_{ij} = \frac{\sum_{k=1}^{N} w_{ik} s_k(f(k,j))}{\sum_{k=1}^{N} w_{ik}},$$

$$1 \leq j \leq M$$

Note that equation (15) is the same as equation (5), except that the subscript 0 of $P_{0j}$ and $w_{0k}$ in (5) has been replace by i in (15). From equation (15), although the summation is performed from 1 to N, only data from K aperture positions are contributed to the final value of the image pixel since $w_{ik}$ generated from equation (13) only contains K non-zero elements. Also note that the value of the denominator $\Sigma_{k=1}^{N} w_{ik}$ in equation (15) represents the number of non-zero elements. This value is used as normalization factor for the final image pixel value.

The magnitude image $E_i$ using data from aperture $A_i$ is then computed from the bipolar image $I_i$ as described in step 2.

$$E_i = |\text{Hilbert}(I_i)|, \tag{12}$$

Referring again to FIG. 17, the fifth step of a preferred embodiment comprises the repeating of the third and fourth steps for L iterations (1≤i≤L).

Referring again to FIG. 17, the sixth step of a preferred embodiment comprises classifying each pixel in the SAR image based on the statistical distribution of its amplitude across L iterations. There are two possible classes: 1) target class that includes the pixels that are originated from physical objects (main lobes), or 2) noise class that includes the pixels originated from some artifact sources (noise, sidelobes).

For each $j^{th}$ pixel in the image grid, the decision statistic is the standard deviation of the amplitudes of the pixel $P_{ij}$ across L iterations, and this standard deviation normalized by the mean value of the amplitudes.

$$d_j = \frac{\sqrt{\frac{1}{L}\sum_{i=1}^{L}(P_{ij} - \overline{P}_j)^2}}{\overline{P}_j}, 1 \leq j \leq M, \tag{13}$$

where $$\overline{P}_j = \frac{1}{L}\sum_{i=1}^{L} P_{ij}, 1 \leq j \leq M. \tag{14}$$

The decision statistic described in equation (13) represents the fluctuation (or randomness) of the amplitude of a pixel across L iterations.

Referring again to FIG. 17, the seventh step comprises computing the pixel characterization SAR image (both magnitude and complex) based on the decision statistics from step 6.

First, a binary image is generated based on the decisions statistics computed from equation (13). Each $j^{th}$ pixel in the binary image has a value of 0 (to represent non-target pixel) if its decision statistic $d_j$ is greater than a threshold T, and 1 (to represent target pixel) otherwise.

$$Eb = \langle Pb_j \rangle, 1 \leq j \leq M \tag{16}$$

where
  $Pb_j = 0$, if $d_j > T$,
  $Pb_j = 1$, if $d_j \leq T$.

The binary image contains NZ non-zero elements, Z zero elements. The total number of the pixels in the image is M=NZ+Z.

The resulting magnitude image is computed as $$E = \langle P_j \rangle, 1 \leq j \leq M \tag{16}$$

where
  $P_j = 0$, if $d_j > T$,
  $P_j = \max(P_{ij})$, 1≤i≤M, if $d_j \leq T$.

Since most of the pixels in the image are classified as non-targets, this would generate a very low noise floor in the resulting SAR image. The remaining pixels are classified as targets. Each of these pixels will have the maximum value across many iterations. Thus, the technique virtually wipes out the noise floor that includes the sidelobes, and maximizes the responses from the targets.

The resulting magnitude image of equation (16) is not a complex image. That means the phase information is not preserved in the image. The amplitude feature is probably the most important one in SAR imaging, especially for the detection of difficult targets in the noisy environment. However, in some cases, it is desirable to exploit the phase information from the targets.

The pixel characterization technique of this preferred embodiment also generates a complex SAR image that includes both amplitude and phase information. From equation (11), the bipolar baseline SAR imagery $I_0$ is generated. This is a bipolar SAR image that includes both amplitude and phase information. However, the baseline SAR image $I_0$ is contaminated with noise and sidelobes. In the binary image Eb from equation (15), the algorithm classifies each pixel in the image into either non-target class or target class. Using this binary image, we can remove the noise floor in the baseline SAR image $I_0$.

The resulting bipolar (complex) SAR image that includes both amplitude and phase information is computed as $$I = \langle P_j, Pb_j \rangle, 1 \leq j \leq M \quad (18)$$

where $Pb_j$ is the binary pixel as defined in equation (15).

The results of the simulation data of the basic concept of SAR imaging show the performance of pixel characterization technique of this preferred embodiment. A simulation data set was generated using the following scenario. The radar travels along a linear path, transmits impulse signals to the side of the vehicle (perpendicular to the path of the vehicle) and captures the return data. Along the path, the radar also records its coordinates at every transmit/receive cycle. The coordinate measurement also introduces errors in the measurement data. There are four point targets in the scene. The data received by the radar is contaminated with additive white noise that is due to system external RFI sources.

Figure 18:
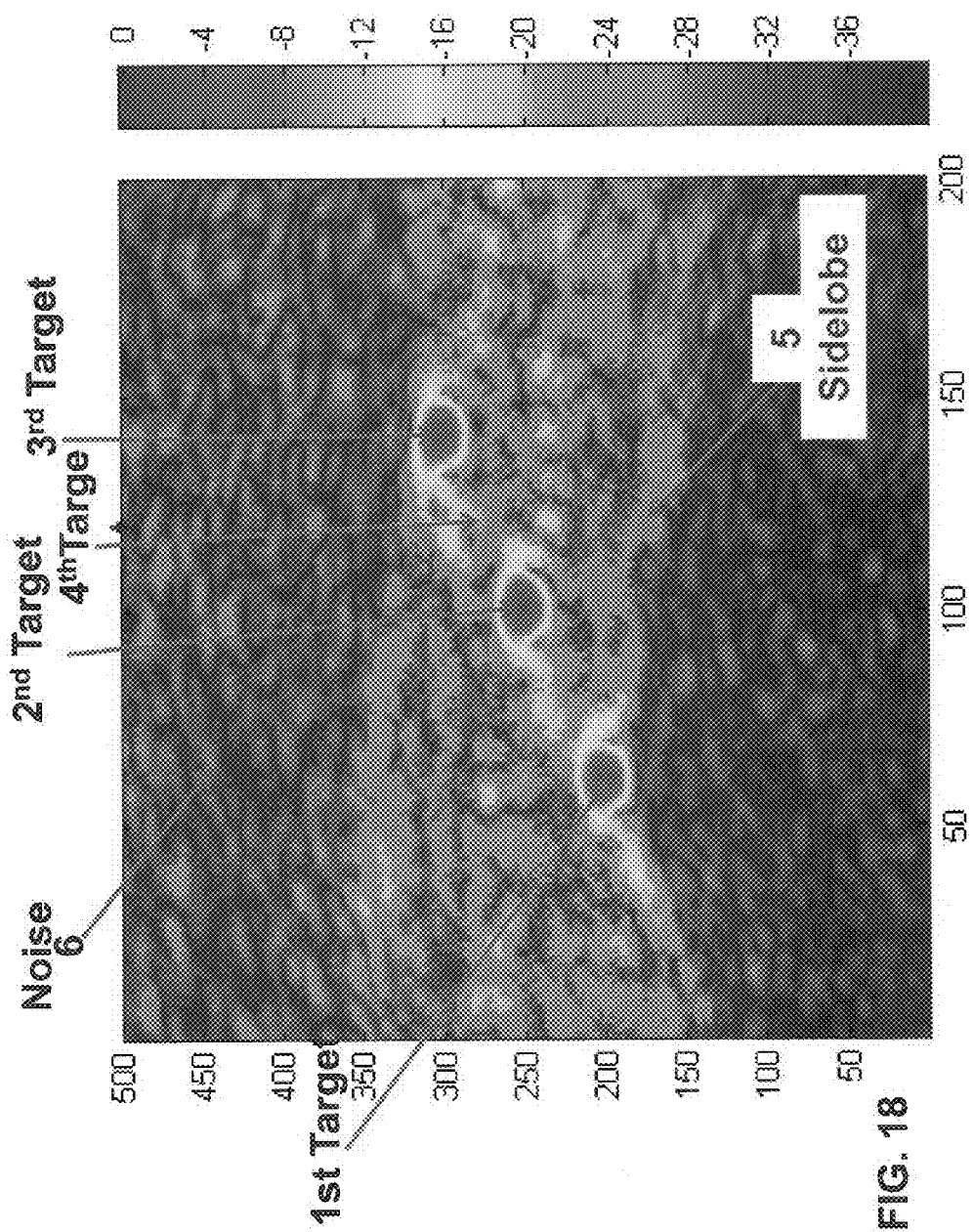
FIG. 18 illustrates a SAR image generated from the return data using the standard backprojection image formation algorithm.

FIG. 18 shows a SAR image generated from the return data using the standard backprojection image formation algorithm. Although the SAR image formation improves the SNR by the integration across the aperture, the additive noise level is still very high in the SAR image. In addition, the severe sidelobes from the large targets are much more challenging. The energy from the main lobes of the large targets spreads to the surrounding area. The error from the measured radar position data causes the leaking of the energy from the main lobes. The limitation of the aperture length is the main source of the uncancelled sidelobes.

There are four simulated point-targets in the SAR image. The three high amplitude targets ($1^{st}$, $2^{nd}$ and $3^{rd}$) are obvious in the image. They are located at the pixel coordinates (60, 200), (100,250), and (140,300), respectively. There is a fourth point target that exists in the SAR image at the coordinate (125,275). This coordinate is at the midpoint between $2^{nd}$ and $3^{rd}$ targets. This fourth target is not visible from the image since its RCS is so low that its response is embedded in the noise floor.

Figure 20C:
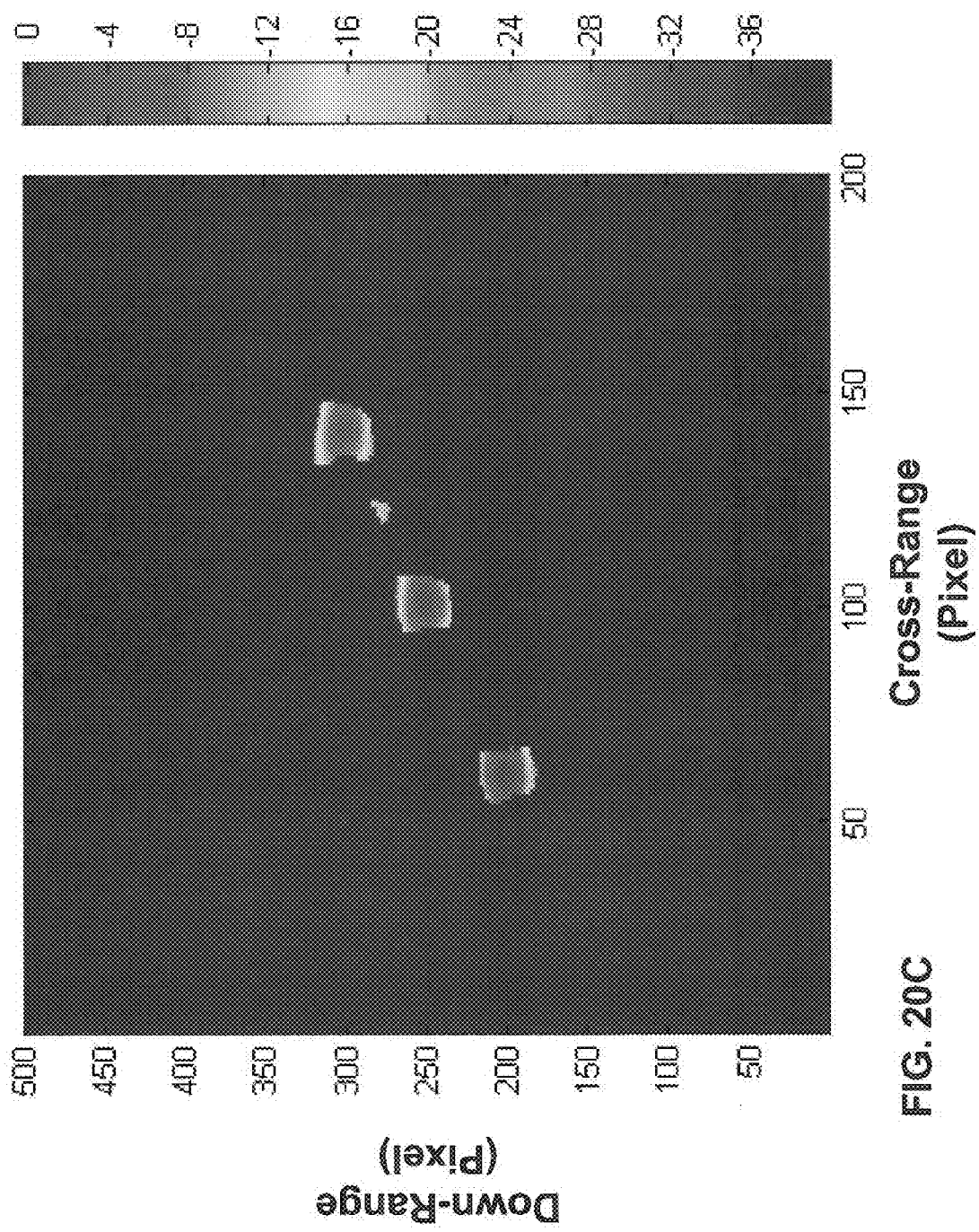
FIG. 20C illustrates an image of all four targets processed by a preferred embodiment.

The decision statistic described in equation (13) to classify a pixel is the standard deviation of the pixel amplitudes across all iterations, and normalized by its mean amplitude. Due to the scale property of the standard deviation, equation (13) can also be expressed as the standard deviation of the pixel, amplitudes that are normalized by its mean across all iterations. Thus, it was desirable to examiner the statistical differences of the normalized pixel amplitudes across different iterations between pixels that belong to target class and noise class. FIG. 19A compares the normalized pixel amplitudes of a pixel that belongs to second target (from FIG. 18) (shown as a blue line in FIG. 19A) and a pixel that belongs to a sidelobe (5), shown as a red line in FIG. 19A. The distribution, of the normalized amplitudes of the target pixel is much more stable than that of the sidelobe pixel. FIG. 19B shows the same distributions for the second target's (labeled as 2) pixel, as shown by a blue line, and a noise pixel (6), as shown by a red line. Again, the distribution of the normalized amplitudes of the target pixel is much more stable than that of the noise pixel. FIG. 20A shows a much more challenging case, which compares the normalized pixel amplitudes of a pixel that belongs to target 4 of FIG. 18 (a very weak target that is embedded in the noise/sidelobe floor) and a pixel that belongs to a sidelobe (5) of FIG. 18. Although the normalized amplitudes of $4^{th}$ target are slightly fluctuated, as shown by the blue line in FIG. 20A, they are much more stable than the normalized amplitudes of the sidelobe pixel, as shown by the red line in FIG. 20A. Similar result is shown in FIG. 20B that compares the normalized amplitudes of $4^{th}$ target (of FIG. 18) versus a noise pixel (6) (of FIG. 18).

Figure 21:
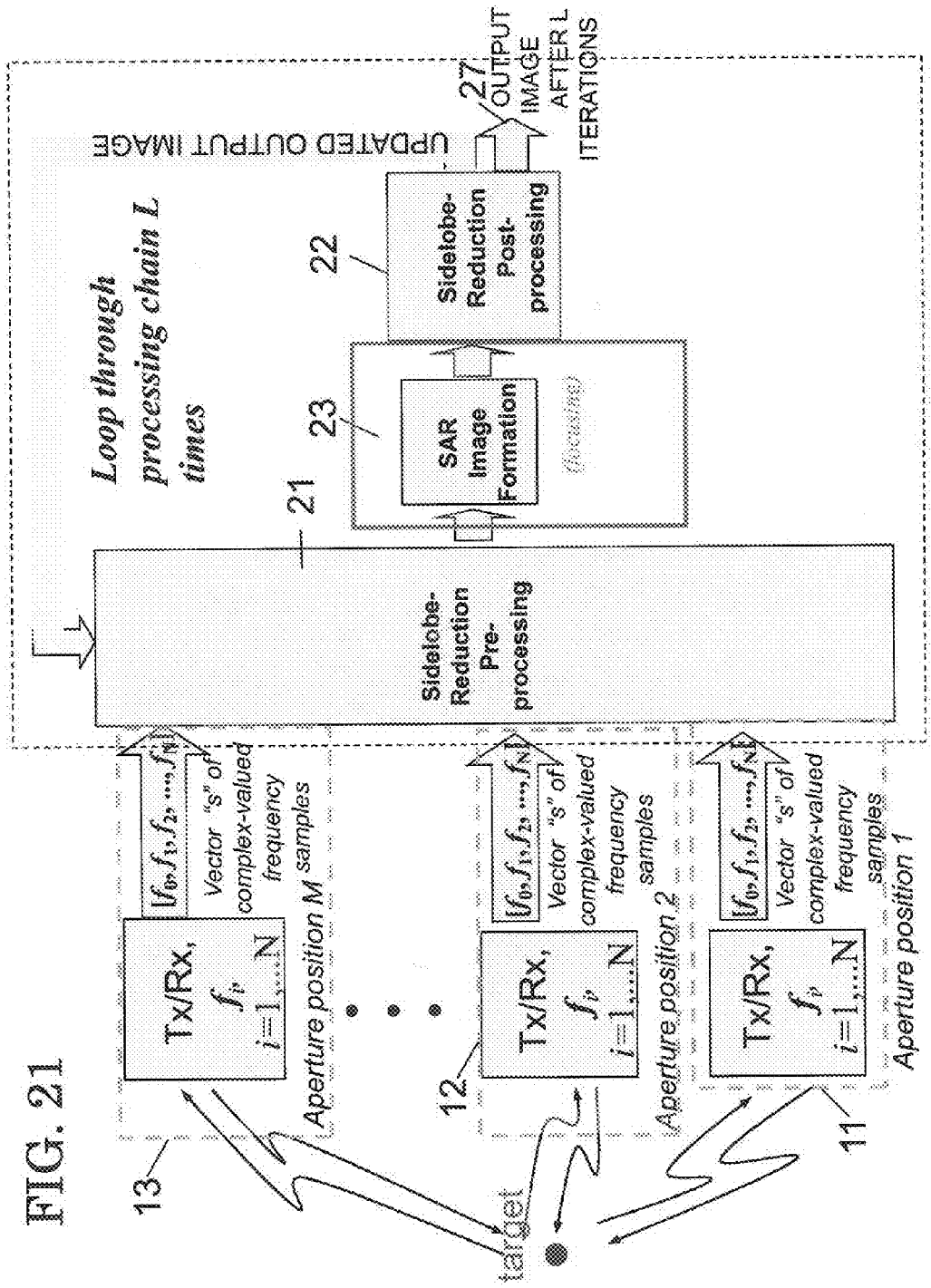
FIG. 21 illustrates a schematic block diagram of preferred embodiment of the present invention.

The envelope image of equation (16) is shown in FIG. 21. This image shows all four targets, including the 4th target that represents one very challenging case for a SAR imaging system. The noise floor generated by the additive white noise and the sidelobes is completely wiped out from the resulting image.

The IF-PC imaging technique has been shown to work so well on the simulation data. Usually, the application of any technique on real data is much more challenging because of many unknown factors in real systems. In this section, we present results using radar data from the Army Research Lab SAR radar as described in Lam Nguyen, "Signal and Image Processing Algorithms for the U.S. Army Research Laboratory Ultra-wideband (UWB) Synchronous Impulse Reconstruction (SIRE) Radar," ARL Technical Report ARL-TR-4784, April 2009.

Figure 14:
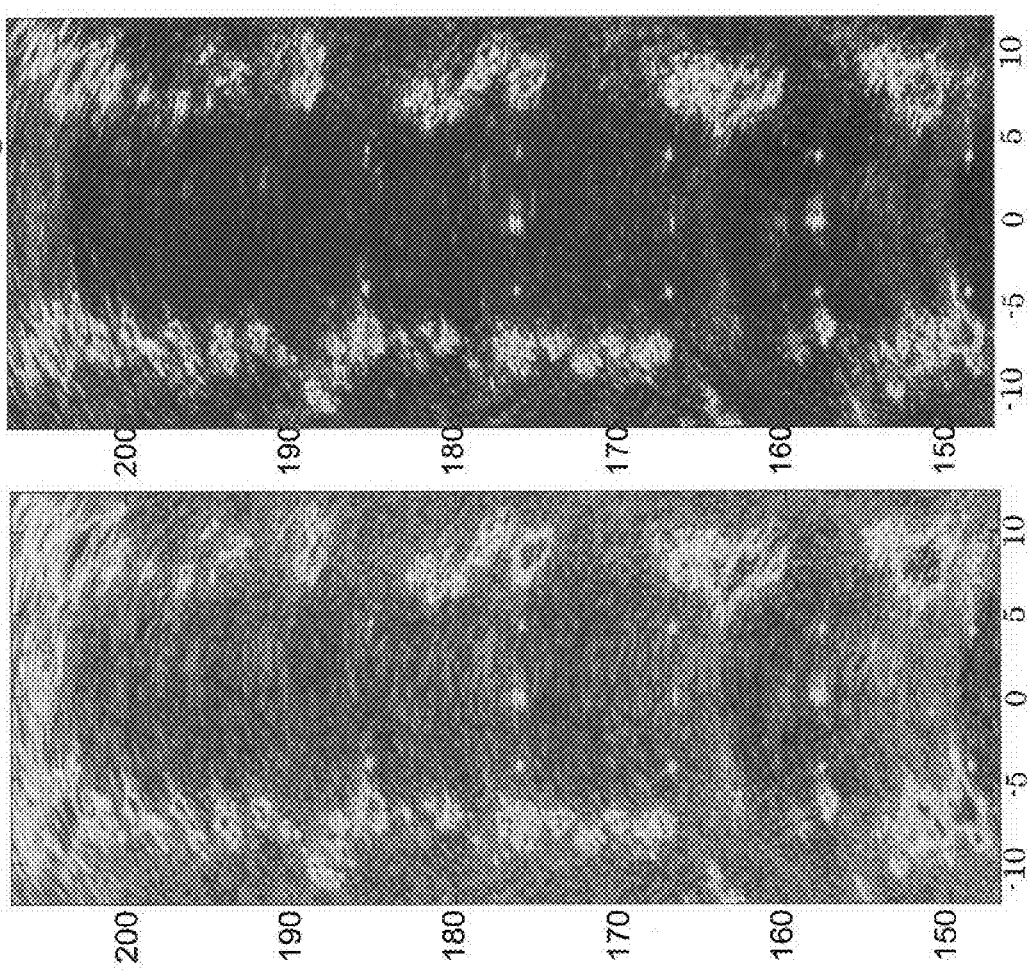
FIG. 14A illustrates the baseline SAR imagery using data from the ARL low-frequency Ultra-wideband (UWB) SAR radar; after application of noise suppression techniques to the radar data before forming this baseline image.
FIG. 14B illustrates the same SAR image as FIG. 14A with the application of RSM technique from U.S. Pat. No. 7,796,829; which (FIG. 14B) has much higher signal-to-noise ratio (SNR) (10 dB) due to the application of the RSM technique. Note that although the RSM technique significantly suppresses the noise level, its resulting image includes only amplitude information.
FIG. 14C illustrates the same SAR image as FIG. 14A with the application of a preferred embodiment technique whereby all the SAR image is substantially noise-free while all the targets are still preserved and this preferred embodiment generates SAR imagery with both amplitude and phase information.

FIG. 14A shows the baseline SAR image using the radar data collected in forward-looking mode. The details of the processing algorithm are reported in Lam Nguyen, "Signal and Image Processing Algorithms for the U.S. Army Research Laboratory Ultra-wideband (UWB) Synchronous Impulse Reconstruction (SIRE) Radar," ARL Technical Report ARL-TR-4784, April 2009, hereby incorporated by reference. Note that the SAR image is displayed using a very wide dynamic range (50 dB). Although many processing techniques have been applied to produce the SAR image of FIG. 14A, the noise floor is still very high. The targets of interest in this case represent a very challenging scenario, where it would be difficult to reliably detect these small and low amplitude targets in the presence of severe noise and sidelobes. FIG. 14B shows the same SAR image that has been generated using the ARL RSM technique described in U.S. Pat. No. 7,796,829. Although the noise floor in the SAR image of FIG. 14B has been reduced significantly (more than 10 dB) and this performance was unprecedented at that time, the residual noise level is still visible.

Applying the pixel characterization imaging formation technique of this preferred embodiment to the same data generated the SAR image of FIG. 14C. From FIG. 14C, the SAR image is virtually noise-free. All the targets of interest are still preserved in the SAR image that is generated by this preferred embodiment pixel characterization technique. The preferred embodiment provides both amplitude and phase information. A key concept is the classification of each pixel in the image into either a target class (physical objects) or non-target class (noise, sidelobes) based on its statistics from many realizable sparse aperture images. If an image pixel is classified to be associated with a physical object, its value is computed from its statistics. Otherwise, the pixel is assumed to come from a non-physical object (noise source) and its value is simply zero. In general, in the case of noise, fluctuations appear; whereas a physical object exhibits more stability. The value is maximize for stable (physical object) pixels. The present invention enables the detection of very small objects that are embedded in the image noise floor; especially if the targets are located in the proximity of larger objects. The invention may be utilized in conjunction with existing systems.

Examples of potential applications include implementation of practical systems for detecting targets in the most challenging scenarios. Some examples includes 1) the SAR imaging of the ship or building interiors, where the targets of interest have much smaller responses than the structure of the ships or buildings, 2) The detection of buried mines along and on the sides of the road, where the responses of the buried mines are significantly smaller than the man-made, bushes, and trees along the road, 3) the detection of difficult targets (abnormal features, tumors) in medical imaging application.
Iterative Fourier Side Lobe Reduction for Stepped Frequency Synthetic Aperture Radar Recursive sidelobe minimization (RSM) has been applied extensively to data sets in which no constraints have been placed on the amount of transmitted bandwidth. That is, no frequency notching was required prior to transmission of the waveform. This is an extension of the earlier RSM technique designed to reduce the artifacts introduced by frequency notching. Results obtained applying the technique to both simulated and measured data are described in the accompanying Figures.

A block diagram of a preferred embodiment and processing methodology is implemented in a synthetic aperture radar (SAR) system is shown in FIG. 21, wherein a dashed box indicates the general location of the improved sidelobe reduction pre-processing algorithm, the sidelobe reduction post-processing algorithm, and the iterative processing procedure indicated by the I-iteration loop in the diagram. Note that the SAR image formation algorithm, as described in, inter alia, U.S. Pat. No. 7,796,829, indicated by a solid rectangle 23 within the larger dashed rectangle 10, remains an integral part of the enhanced formulation; hence, the invention could be incorporated into any stepped-frequency SAR image formation process, without departing from the scope and spirit of the invention.

The preferred embodiment methodology substantially reduces the severity of sidelobe artifacts due to the elimination of n of the N frequencies comprising the stepped frequency waveform. It is derived in part from a novel application of concepts from the theories, referenced in H. C. Stankwitz, R. J. Dallaire, and J. R. Fienup, "Nonlinear apodization for side lobe control in SAR imagery," *IEEE Trans. Aerosp. Electron. Syst.*, Vol. 31, No. 1, pp. 267-279, January 1995, here by incorporated by reference, and Emmanuel Candes, Justin Romberg, and Terence Tao, Robust uncertainty principles: Exact signal reconstruction from highly incomplete frequency information. (IEEE Trans. on Information Theory, 52(2) pp. 489-509, February 2006), hereby incorporated by reference. Although the present invention bear some similarity to U.S. Pat. No. 7,796,829 to Nguyen (hereinafter '829 Nguyen patent), the preferred embodiment methodology addresses a problem that is fundamentally different than that addressed in the '829 Nguyen patent. The problem formulation of '829 Nguyen patent concentrated on artifacts observed when the entire transmitted bandwidth is available. The present invention concentrates on, inter alia, artifacts induced by limiting the allowed transmission frequencies to a subset of the available band (i.e. "notching out" specific frequency steps).

FIG. 21 is a block diagram of a preferred embodiment methodology, and its relation to the current image formation paradigm. FIG. 21 provides a pictorial representation of how the SFRSM processing, modifies the earlier SAR processing chain. The dashed line labeled 10 encloses the SFRSM, processing loop, while the solid box 23 within the dashed line encloses the SAR image formation step.

Figure 24:
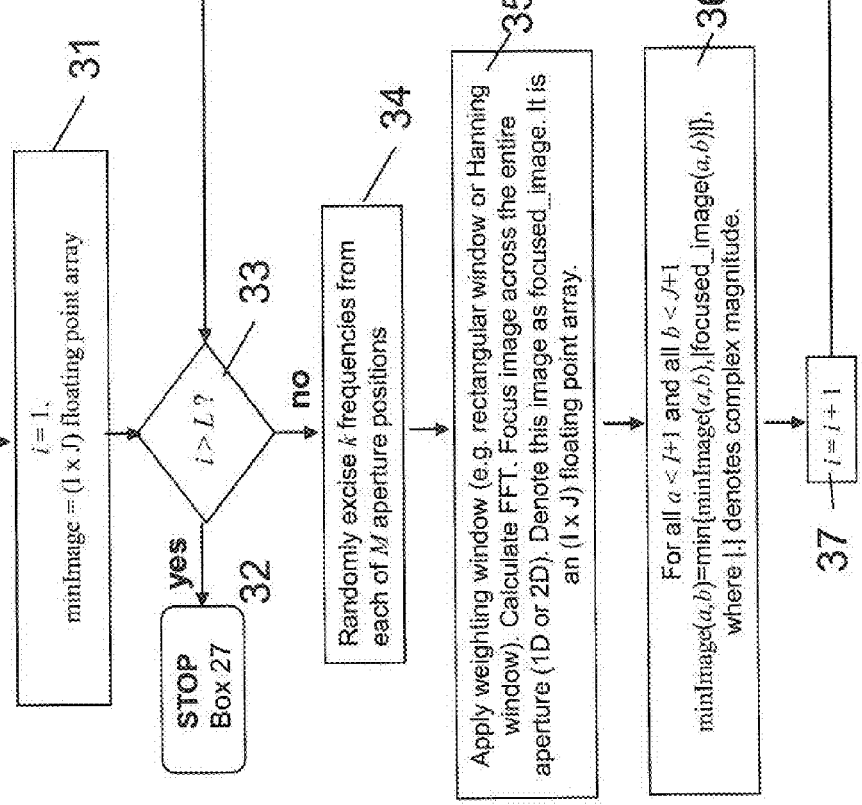
FIG. 24 illustrates a schematic flow chart wherein the output is I×J pixels, L is the total number of iterations, k is the number of frequencies retained by the SFRSM algorithm, focused_image is the I×J image that is produced during each iteration, and minImage is the processed image output by the algorithm. Note, also, that the SFRSM forfeits phase information because only pixel magnitudes are compared and saved.

The processing steps denoted as "Sidelobe-Reduction" processing in FIG. 21 are described in more detail by the flowchart in FIG. 24.

Referring to FIG. 24, for each value of the loop counter, i, from 0 to L−1, the algorithm first selects a random subset of frequencies from those available after notching (k out of N−n). It then calculates HRR profiles for each of the SAR aperture positions, using the k randomly selected frequency samples, and creates a SAR image, denoted "focused_image." The complex magnitude of each pixel in focused_image is next compared with the magnitude of the corresponding pixel in minImage. If the pixel value in focused_image is smaller than that in minImage or if the value of i equals 0, then the current pixel value in minImage is replaced by the pixel value in focused_image. The effectiveness of this approach rests on the basic tenet that those contributions to image pixel values due to true objects within the image should remain consistent, regardless of the frequency steps excised. Since certain sidelobe patterns may cause small targets to be overwhelmed by nearby larger targets, the minimum value obtained from several different sidelobe configurations (i.e. several different SFRSM frequency sets) should represent a better estimate of the true underlying image pixel value. Once the extraneous sidelobe energy has been removed, what remains should represent the true underlying image pixel value.

Figure 22:
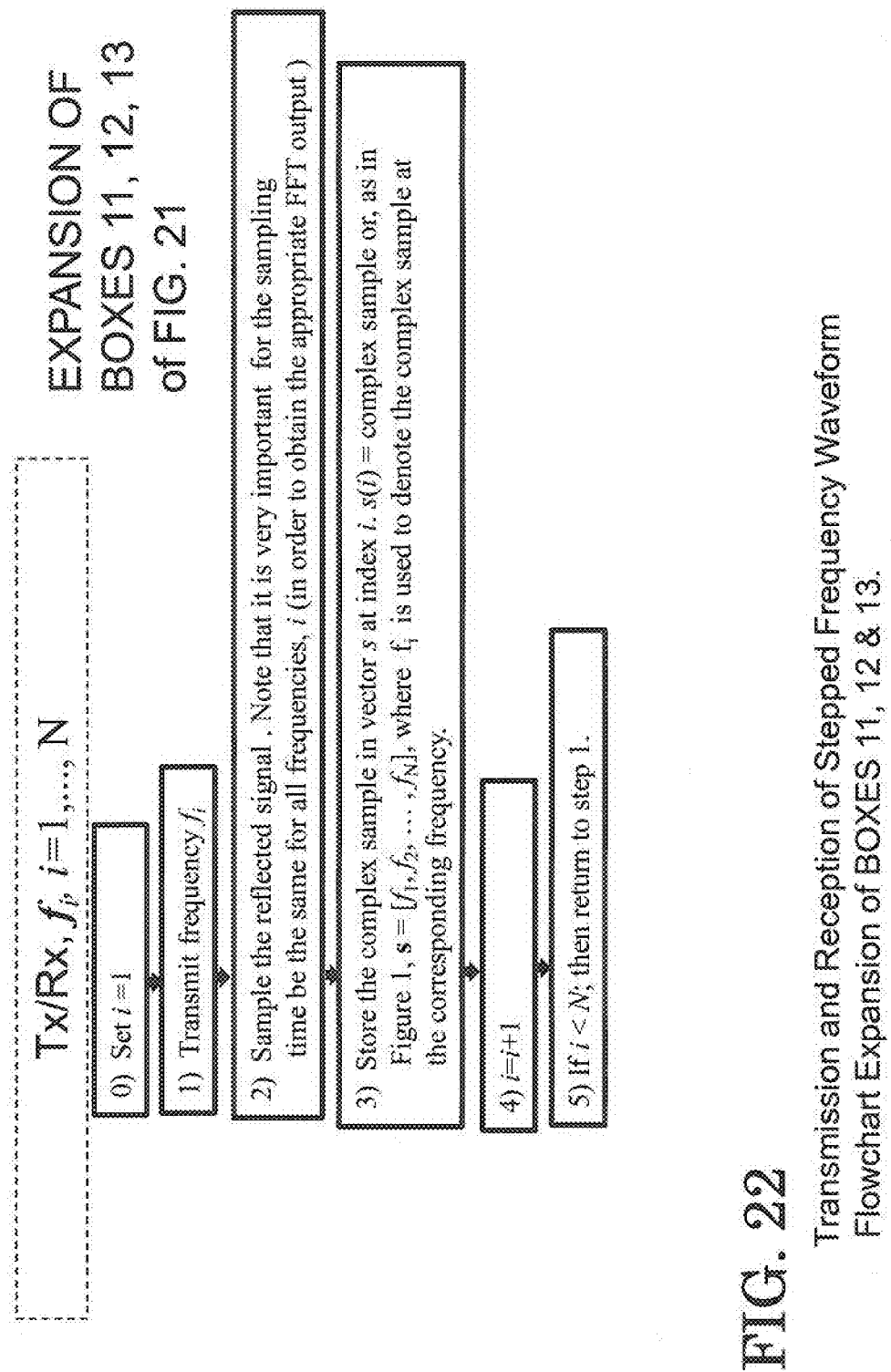
FIG. 22 illustrates a schematic flow chart of steps representing an expansion of boxes 11, 12, and 13 of FIG. 21.

FIG. 22 is a schematic expansion of the steps, represented pictorially by boxes 11, 12, and 13 in FIG. 21. Following completion of these steps, the Vector s contains a set of frequency samples collected at the same time instant. These represent a Transformed version of the desired time-domain signature. Hence, by taking a Fourier transform, one can obtain the desired time-domain signature. Note that the direction of the FFT does effect the nature of the time-domain signature, and it will be determined by the sweep direction (ascending or descending) of the transmitted frequency steps. An inverse FFT for ascending frequency steps and a forward FFT for descending frequency steps is utilized.

Figure 23:
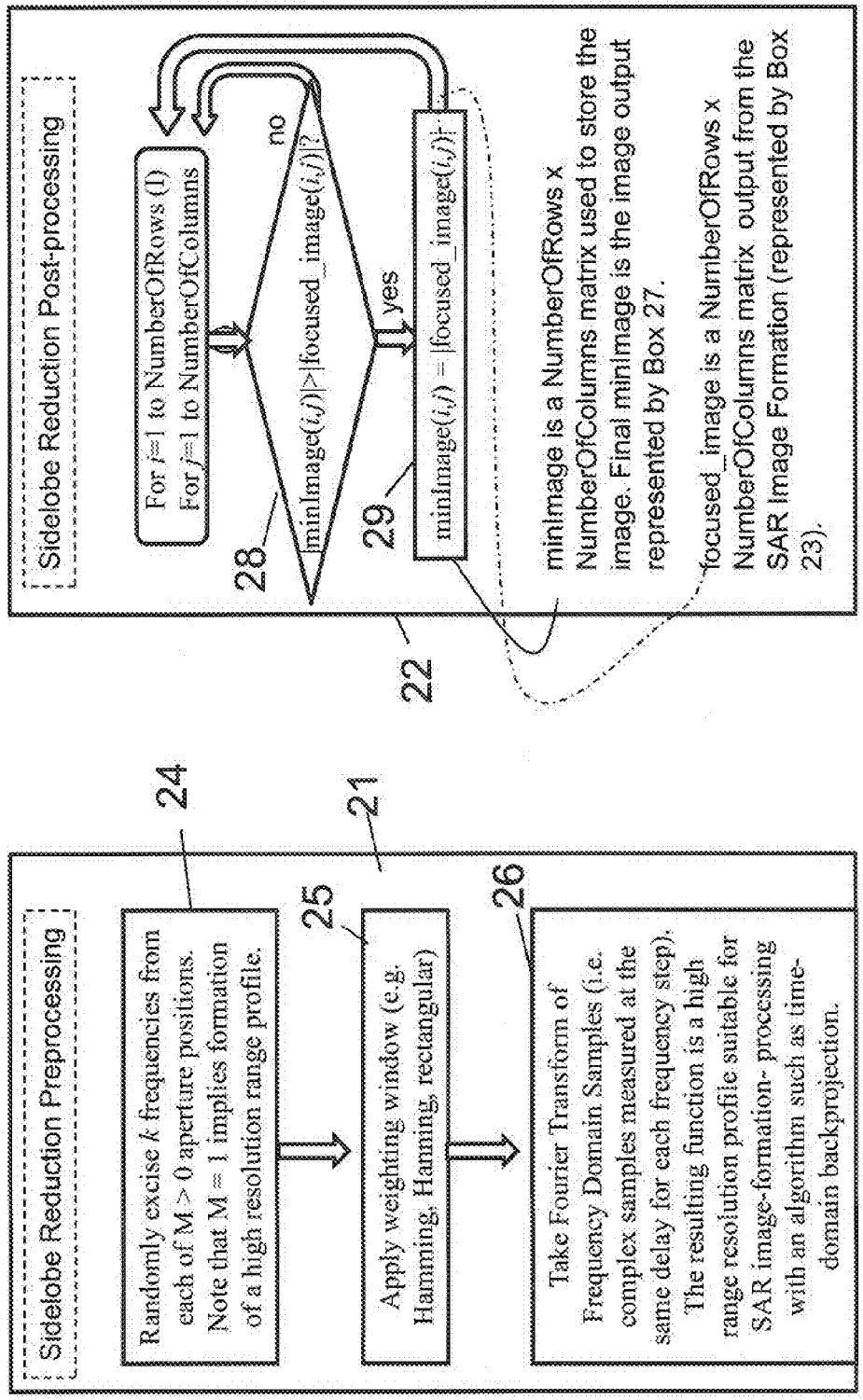
FIG. 23 illustrates an expansion of processing represented by blocks in FIG. 21 comprising Sidelobe Reduction Pre-processing (represented by Box 21) and Sidelobe Reduction Post-processing (represented Box 22). Note that if the process is used only to form a high resolution range profile (i.e. a high resolution signature); then the SAR Image Formation block becomes a 1-Dimensional Fourier Transform and there is a single Tx/Rx box on the left side of FIG. 1.

Referring now to FIG. 23, one can see that the preprocessing box depicted in FIG. 21 comprises: (i) random excision of k randomly selected frequency steps from the N−n steps available after transmission restriction, (ii) weighting of the remaining samples (iii) calculation of the high resolution time-domain signature via an FFT. Similarly, the postprocessing box, comprises a pixel-by-pixel comparison of the magnitude of the current image with the minimum value calculated for that pixel up to the current iteration. The smallest value in this comparison becomes the new minimum value stored at those pixel coordinates. Finally, as shown in these figures, the process terminates after L iterations.

Experimental Results

From an analysis of FIGS. 21 and 24, one can appreciate that the preferred technique illustrated, inter alia, in FIGS. 21 and 24 (SFRSM) trades processing time for a reduction in sidelobe levels. AS a result, it is rather computationally intensive and time-consuming. In order to better understand the amount of improvement obtained through implementing the system illustrated in FIGS. 21 and 24, considered are both simulated and measured data, comparing images generated both with and without SFRSM.

Simulated Data

In order to evaluate the benefits realized through the incorporation of the preferred embodiment system of FIG. 21, SAR imagery was first formed using a simulated stepped-frequency system. This system comprised a forward looking antenna array with 16 equally spaced receive antennas, the left-most and right-most of these also serving as transmit antennas. Since it was also intended to replicate the collection geometry of the Army Research Lab's (ARL's) vehicle-mounted Synchronous Impulse Reconstruction (SIRE) radar 12, the system's antenna array stood 2 m above the ground. The left and right transmitters fired sequentially, each transmitter launching its burst of frequencies while the vehicle remained stationary. In addition, each transmitted burst included all frequencies separated by 5 MHz steps and spanning the band between 5 MHz and 3 GHz inclusive.

Figure 25:
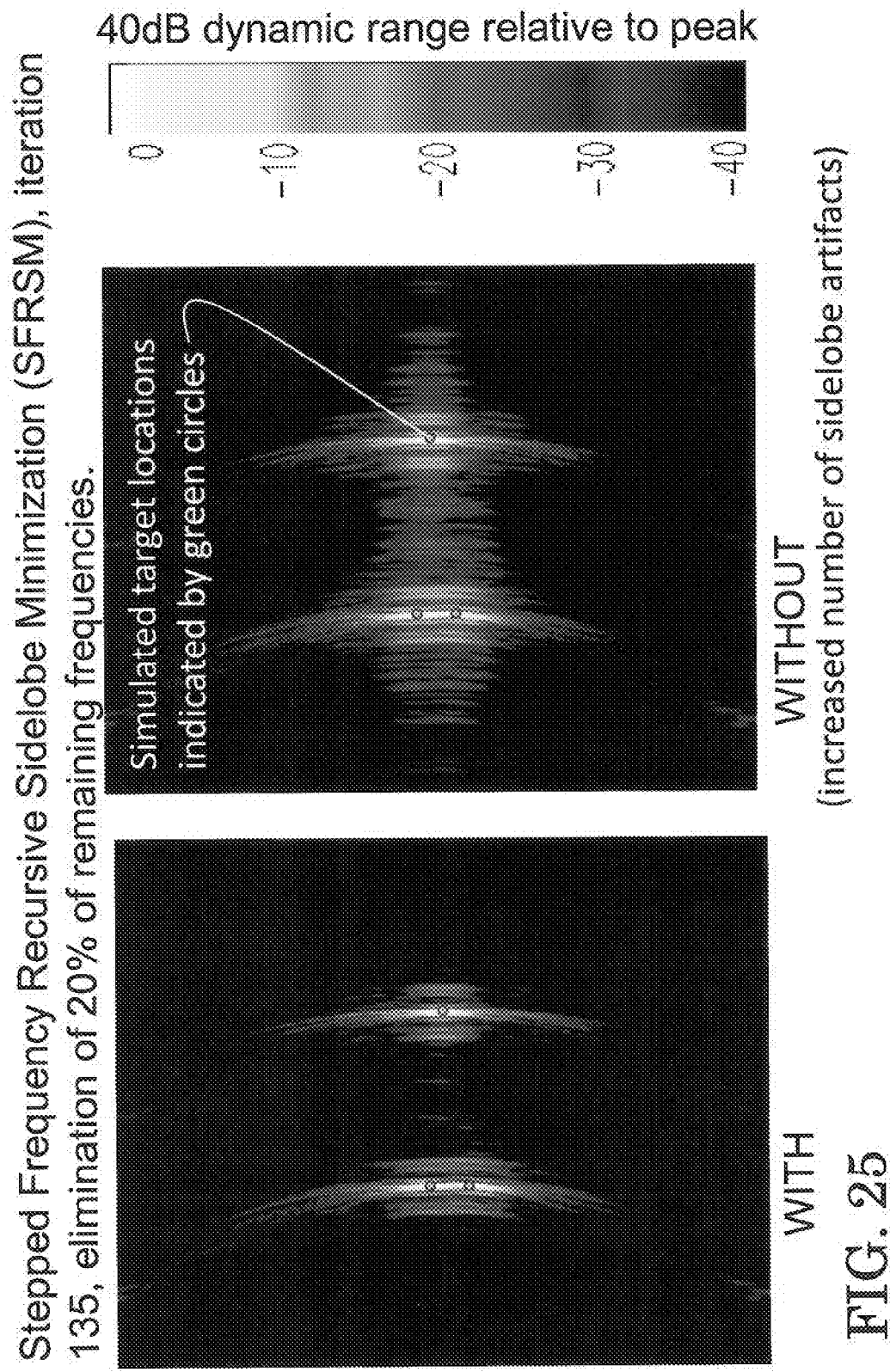
FIG. 25 illustrates an example of simulation results for a first target configuration obtained using the preferred embodiment technique showing a comparison (with and without) (three simulated targets represented by green circles).
Figure 26:
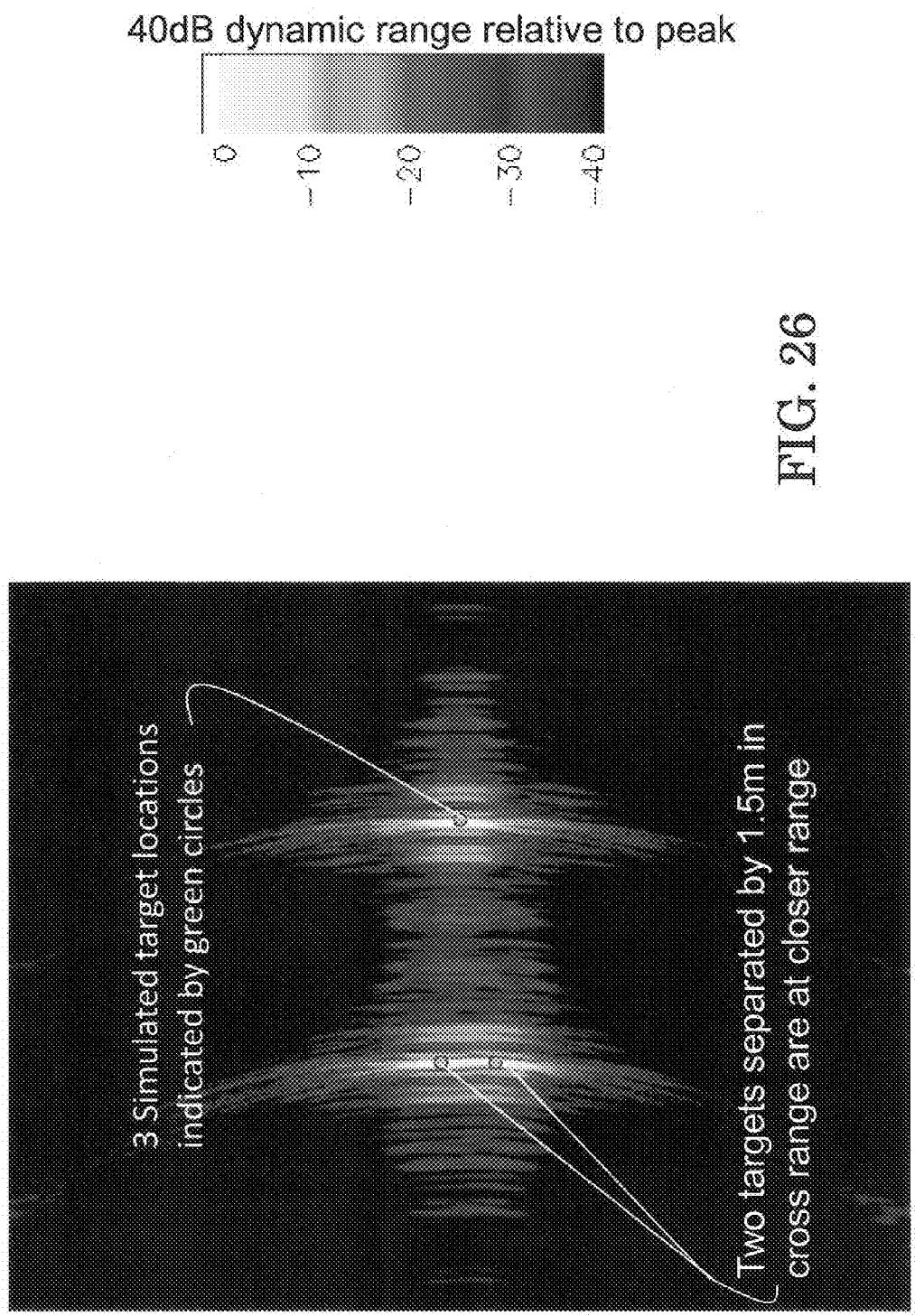
FIG. 26 illustrates an image with straight FFT, frequencies excised, no apodization, and 19.1% of bandwidth excised.

At the beginning of the simulation, the center of the antenna array was located at coordinate (0,0,0), and it moved 0.125 m following the transmission of each frequency burst until data had been collected from a 25 m span of along-track vehicle positions. This data collection process yielded a two-dimensional synthetic aperture of data collection locations separated by 0.125 m in both the along-track and cross-track dimensions. Targets were simulated as point responses with elevations all equal to zero, and the positions of these targets within the x-y plane are shown in FIGS. 25 and 29 for the two configurations considered. All target responses were assumed to be identical and uniform as a function of frequency.

The along-track (or down-range) vehicle positions together with the individual receiver positions (within the array) constituted the two-dimensional synthetic array used to produce focused SAR imagery. After all of the target responses had been simulated for the various radar locations, we proceeded to excise ("notch") frequencies within the following bands: 100-200 MHz, 400-450 MHz, 850-1000 MHz, 1150-1250 MHz, and 1900-2050 MHz. During each iteration of the SFRSM algorithm, as indicated by the loop index i in FIG. 24, an additional 20% of the remaining frequencies were randomly eliminated—setting their corresponding entries to zero—before converting to the time domain. When iteratively applied, this randomization provided the key to reducing sidelobe artifacts in the final output image. The first step in producing a focused image involved the creation of the HRR range profiles required by the time-domain backprojection algorithm. This was accomplished by applying a weighting window to the newly formed frequency-domain sequence and then calculating its IFFT. The rest of the processing could then be performed using the resulting time domain sequence.

Referring now to FIG. 24, preferred embodiment system implements an iterative procedure that achieves results by excising a different set of randomly selected frequencies at each iteration. In what follows, it is assumed that N−n of the available frequencies must be excised due to restrictions from a regulating authority, and (as a result) cannot be transmitted. The k frequencies to be excised by the algorithm are selected from this reduced set. It is noted that during the data collection, restricted frequencies (set by the FCC) are eliminated prior to transmission; i.e., only the "allowed" frequencies are received and transmitted. Thus the frequency samples inputted into Box 31 comprise a received complex signal at each low resolution range gate. In Box 31, the system initializes the output array (minImage) and the looping variable (i). Note that all pixel values in minImage in Box 31 are initially set to extremely large values (effectively, +∞). In diamond 33, the number of iterations are set at a number L, and if the iteration count i is not greater than L, the steps in Boxes 34-37 are repeated. A larger L results in better output imagery; at the expense of increased computational time. As an example, the value of L may be selected as 20. In Box 34, k of the available n frequencies are randomly selected and the complex samples collected at these frequencies (at each of the M aperture positions) are set to zero (effectively removed). In Box 35, the high resolution signature (via the FFT) is formed and the SAR image is created using a suitable focusing algorithm. This yields an (I×J) complex 2D image. In classical SAR imaging (e.g. airborne collection assets) the aperture is 1D, but it can also be 2D (e.g. an antenna array, mounted on an SUV, that moves forward and creates a radar picture of the road in front of it). In Box 36, the complex magnitude of each pixel is determined in the newly formed SAR image. These values are compared with the corresponding pixel value in the output array. A value is replaced in the output array if the newly calculated value is smaller than the current output value.

Figures 28A, 28B:
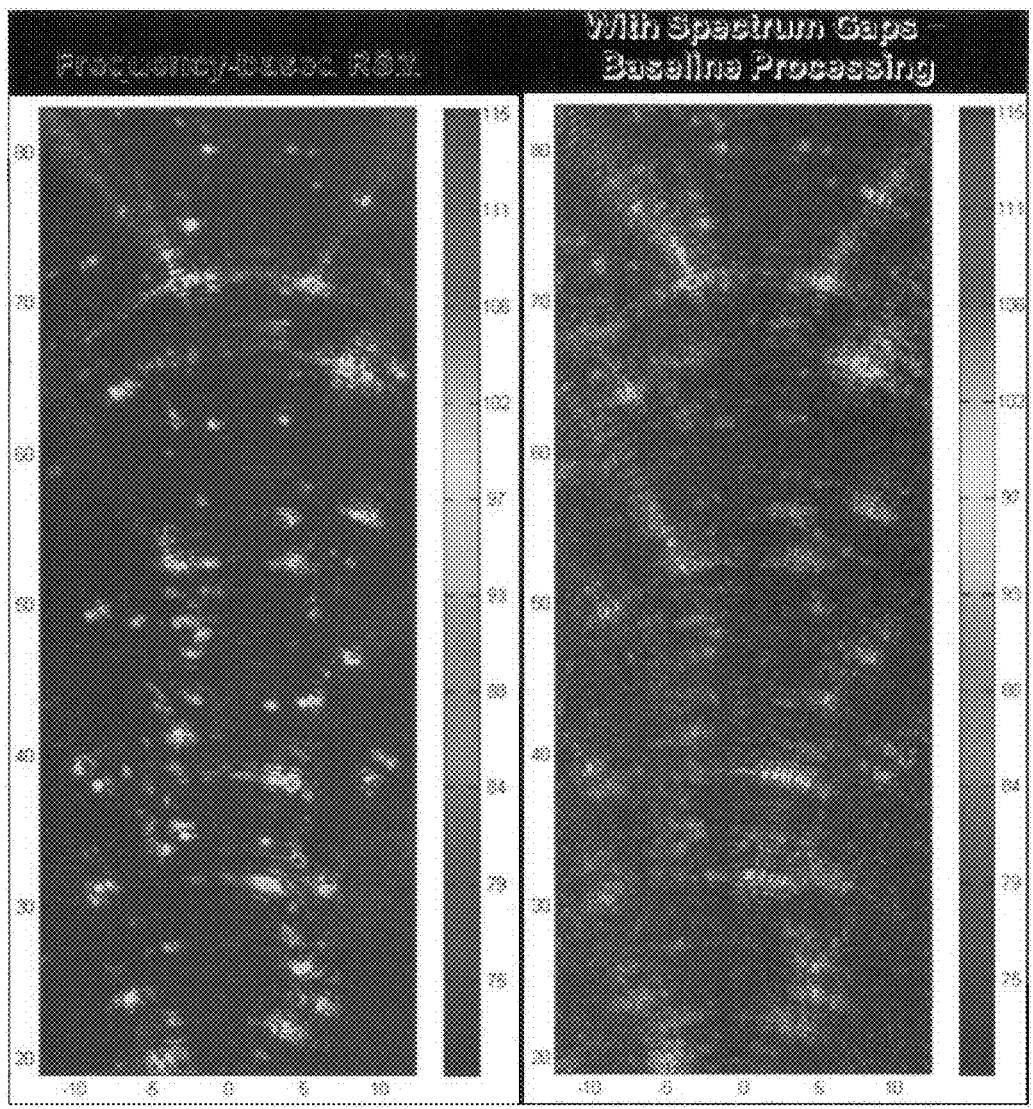
FIG. 28A illustrates results with a frequency-based RSM with Spectrum Gaps-Baseline processing. The simulation results are for a target configuration comprising 17 simulated targets.
FIG. 28B illustrates results without a frequency-based RSM with Spectrum Gaps-Baseline processing. The simulation results are for a target configuration comprising 17 simulated targets.

The preferred embodiment processing, as outlined in FIG. 24 continued until 100 iterations had been completed, and the resulting image is included in FIG. 4(*a*). FIGS. 28A and 28B illustrate simulation results for a target configuration comprising 17 simulated targets. FIG. 28B shows the output image produced without implementing the SFRSM procedure and simply tolerating any artifacts that may be introduced by frequency notching. In both cases, the target emplacement pattern becomes clear from the imagery after consulting the plot of FIG. 29. It is noted note that many non-target regions that exhibited relatively strong sidelobe artifacts (on the order of 20-30 dB below the peak) before the application of SFRSM no longer exhibit these artifacts after SFRSM has been applied. This implies these sidelobe levels have been reduced by at least 10-20 dB.

Measured Data

Artificially notched data was created using existing measurements collected by ARL's SIRE system. It is noted that, because the SIRE system is impulse-based, all of the HRR profiles first had to be converted to the frequency domain. Only then could one apply the necessary notches and perform the necessary SFRSM processing. Hence, each random excision of frequencies required the application of a separately tuned bandpass filter. For this data set attention was restricted to a hypothesized system bandwidth of 1 GHz, comprising all frequencies ranging from 500-1500 MHz. The following frequency bands were notched: 328.6-335.4 MHz, 400-420 MHz, 608-614 MHz, and 960-1215 MHz, and the SFRSM excised 20% of the remaining frequencies. A total of 50 iterations produced the SAR image displayed in FIG. 28A. Once again the baseline image was included, created without the assistance of SFRSM, to serve as a reference point. Comparison of FIGS. 28A and 28B indicates (albeit qualitatively) the benefits of including SFRSM if frequency notching is required within the current data collection environment. Notice the reduction in ambient background level achieved via SFRSM.

Simulations were performed to determine the utility and practicality of this implementation, and the results are shown in FIGS. 25 and 27 for two different target configurations. The simulated radar system configuration was based on the Army Research Laboratory's Synchronous Impulse Reconstruction (SIRE) radar in that it included 2 transmitters and 16 receivers, all defined to be situated 2 m above the ground. The receivers were equally spaced across a horizontal aperture spanning 2 m, and the transmitters Were co-located with the two outside antennas. The radar collected all frequency steps simultaneously at regular intervals, as the vehicle moved forward. As evident from the figure, the proposed method effectively mitigated many imaging artifacts that are readily apparent in the original imagery.

FIG. 25 (left image) illustrates results obtained using the new technique. Simulated target locations are indicated by green circles. The right side of FIG. 25 illustrates results obtained without the new technique. Simulated target locations are indicated by green circles FIG. 25—Images formed (left) with the new technique, and (right) without the new technique. Notice the increased number of sidelobe artifacts in the right image. The simulated target locations are indicated by green circles.

Illustrated in FIG. 27 are simulation results for a second target configuration (a) with the new technique and b) without the new technique. There are 17 simulated targets, and the improvement realized via application of the new technique is striking. A procedure using measured data collected with the SIRE system has also been evaluates and the results are shown in FIGS. 28 A and 28B. Again, the image quality is noticeably improved after application of the proposed technique.

FIGS. 28A and 28B illustrate results obtained using data collected by the SIRE radar system (28A) using the new technique and (28B) not using the new technique. The reduction in ambient (background) pixel level is readily apparent. The color scale is in dB. Based on results obtained with both measured and simulated data, it is clear that the proposed technique greatly enhances SAR image quality. The above-described processing steps comprise the objects of invention, and when included as part of a band-limited, stepped-frequency SAR system they have been shown to significantly improve the quality of the system's output imagery.

A preferred embodiment system was developed and implemented; the frequency domain analog of the previously documented RSM algorithm. In particular, the system/algorithm effectively leverages the principles of time-domain RSM to ameliorate the effects of sidelobes introduced in SAR imagery by frequency domain notching of down-range radar signatures. The system of the preferred embodiment improves SAR image quality via an iterative procedure that adapts and extends concepts from the theories of apodization and, compressive sensing. This procedure as described incorporates in some detail the incorporation of into an overall SAR image formation process, and the procedure was evaluated using both simulated and measured radar data sets.

Imagery obtained by processing simulated and measured radar data illustrated clearly—albeit also qualitatively—the potential improvement realizable via the SFRSM processing paradigm. Also observed were reductions in certain sidelobe levels of at least 10-20 dB, representing a significant improvement. These lower sidelobe levels would be required to detect targets with small radar cross section (RCS) in the vicinity of large-RCS targets. In a radio-frequency-transmission environment that requires a radar operator to avoid transmitting within specific frequency bands, such a sidelobe minimization strategy becomes crucial. That is, the SFRSM offers an important capability to the modern day SAR system operator and SAR image analyst. Certain small-RCS targets may now become discernible with the help of the system of the preferred embodiment.

As used herein, the term "aperture" means the information or data components used to form an image; which may be for example, an array of data points developed from a scanned area, target or scene which can be used to form an image.

The term "processor" as used herein includes multiprocessors, computers, supercomputers, data processor, laptops, signal processors, personal computers, and/or any component which processes data. The term "image generator" as used herein includes a processor which generate images and/or any element or component, including components within a processor, which generate images. The term "comparator" as used herein means a component within a processor operative to complete a comparison function or a separate processor or component which compares sets of data in order to determine, lesser or equal values.

The present invention may be utilized in radar imaging, magnetic resonance imaging, CAT scans, sonar imaging, acoustical imaging and the like.

The term "bitmap" is derived from a mapped array of bits, and bitmapped and pixmap refer to the similar concept of a spatially mapped array of pixels. The term "bitmapped" as used herein encompasses pixmap. The term "bitmapped" means a set of bits that represents a graphic image, with each bit or group of bits corresponding to a pixel. As used in the following claims, the term "bitmapped" encompasses all images formed using pixels. For example, all images acquired by digital cameras and camcorders, scanners, and screen capture programs are bitmapped images.

As used in the following claims, the term "processor" means one or more processing units, central processing units, processor cores, microprocessors, digital signal processors, multiprocessors, computers, and/or controllers, which may be connected together or to other circuitry in a manner known to those of ordinary skill in the art. As used in the foregoing claims, the terminology "area" includes object(s), person(s), setting, place, or scene. For example, "scanning an area" includes scanning an object or objects, person or persons, place or scene. The terminology positional data includes but is not limited to spatial information relating to location.

As used herein and in the following claims, the terminology "data point" "data point" represents the received signal radar data from each position obtained during an instant or interval in time combined with positional information. The positioning information may, for example, correspond to the transmitting and/or receiving position or location. The data points may be collected by either an array of elements or a single moving element which receives data at points in time, or the combination of both; e.g., a physical array of elements with the elements moving over increments of time. The data collection may be sporadic or at specific intervals of time. As exemplified in FIG. 6, data points are obtained using an array of receiving elements which receive data incrementally. The data points are arranged to form an aperture.

As used herein, the term "aperture" means the information or data components used to form an image; which may be for example, an array of data points developed from a scanned area, target or scene which can be used to form an image. In the apertures depicted in FIG. 6, each column represents an interval during which the 1-k elements receive data; each data point representing the image data from the signal received combined with the coordinates of the receiving element.

As used herein and in the following claims, the terminology "aperture" refers to the collection of K data records along the path (or aperture) of travel of the emitting radar or signal source. In general, the aperture could be a line, a curve, a circle, or any arbitrary shape. The receiving element k from the aperture is located at the coordinate $(x_R(k), y_R(k), z_R(k))$. For bistatic radar (the transmitting antenna is separate from the receiving antenna) the transmitting element k from the aperture is located at the coordinate $(x_T(k), y_T(k), z_T(k))$. For monostatic radar (the transmitting antenna is the same as or co-located with the receiving antenna) the transmitting coordinates $(x_T(k), y_T(k), z_T(k))$ would be the same as the receiving coordinates $(x_R(k), y_R(k), z_R(k))$. Since the monostatic radar case is a special case of the bistatic radar configuration, the algorithm described here is applicable for both configurations. The returned radar signal at this receiving element k is $s_k(t)$. In order to form an image from the area of interest, we form an imaging grid that consists of N image pixels. Each pixel $P_i$ from the imaging grid is located at coordinate $(x_P(i), y_P(i), z_P(i))$. The imaging grid is usually defined as a 2-D rectangular shape. In general, however, the image grid could be arbitrary. For example, a 3-D imaging grid would be formed for ground penetration radar to detect targets and structures buried underground. Another example is 3-D image of inside human body.

After the data points are established in an aperture (or array), as, for example, diagrammatically shown in FIG. 6, a substantial portion of data points are removed from the original aperture (array of data points) to form a "subarray." Conversely, the "subarray" may be formed by the selection of data points within the original aperture.

It should be emphasized that the above-described embodiments are merely possible examples of implementations. Many variations and modifications may be made to the above-described embodiments. All such modifications and variations are intended to be included herein within the scope of the disclosure and protected by the following claims.

The invention claimed is:

1. A computer implemented method for generating images comprising:
   inputting from at least one data receiving element data representing positional and radar data; each of the positional data forming a positional record in an array of positional records; each of the radar data comprising a first number of radar data points in the frequency domain,
   forming an image comprising an array of pixel values comprising:
   a) randomly setting a percentage of the first number of radar data points to zero;
   b) transforming the first number of radar data points into time domain projection data;
   c) forming an image by processing the projection data utilizing an imaging subsystem that combines the positional and projection data to form the SAR imagery utilizing one of a back-projection algorithm or range migration algorithm;
   d) forming the complete aperture $A_0$ for SAR image formation comprising combining the projection data, the coordinates of the receiver, and the coordinates of the transmitter for each positional record;
   e) forming an imaging grid comprising M image pixels wherein each pixel in the imaging grid is located at coordinate $(x_P(i), y_P(i), z_P(i))$;
   f) saving the pixel values for each of the M image pixels into a composite image grid;
   g) randomly setting a percentage of the first number of radar data points to zero;
   h) transforming the first number of radar data points into time domain projection data;
   i) forming an image by processing the projection data utilizing an imaging subsystem that combines the positional and projection data to form the SAR imagery utilizing one of a back-projection algorithm or range migration algorithm;
   j) forming the complete aperture $A_0$ for SAR image formation comprising combining the projection data, the coordinates of the receiver, and the coordinates of the transmitter for each positional record;
   k) forming an imaging grid comprising M image pixels wherein each pixel in the imaging grid is located at coordinate $(x_P(i), y_P(i), z_P(i))$;
   l) comparing the pixel values of the imaging grid to the corresponding pixel values of the composite image;
   m) replacing the pixel values in the composite image grid if the pixel value is less in the imaging grid than the corresponding pixel value of the composite image grid to form a new composite image grid;
   n) repeating the steps g) through m) for a predetermined number of iterations;
   whereby the composite image grid is outputted with reduced sidelobes and noise.

2. The method of claim 1 wherein the step of inputting from at least one data receiving element comprises inputting radar data in either the frequency domain or in the time domain, and wherein if the radar data is in the time domain it is converted first to the frequency domain before the step of randomly removing a percentage of the first number of radar data points.

3. The method of claim 1 wherein the percentage of the first number of radar data points set to zero is in the range of approximately twenty to fifty per cent.

4. The method of claim 3 wherein each radar data point comprises one frequency location and wherein each time a set of radar data points are set to zero the radar data points set to zero are not located in the same set of frequency locations.

5. The method of claim 1 wherein each radar data point is one frequency location and wherein the step of selecting and removing radar data comprises arbitrarily setting a predetermined percentage of radar data to a zero value each time from randomly selected frequency locations within the array.

6. The method of claim 1, further comprising the step of processing return radar signals using a signal processing subsystem, the signal processing subsystem comprising at least one signal processing algorithm performed to suppress unwanted noise from the returned radar data.

7. The method of claim 1 wherein the array of positional records comprises a predetermined number k positional records; the first positional record and the associated radar data represent the positional information and the recorded data obtained during the first increment; the $k^{th}$ positional record in the array and the associated radar data represent the combined positional information and recorded data obtained by the at least one data receiving element during the $k^{th}$ increment; where k is a number greater than 1.

8. A system for generating images from projection data comprising:
   at least one processor for processing input data, the input data comprising positional data and image data, the image data comprising frequency data for a pre-determined number k frequencies
   the at least one processor operating to:
   a) set the frequency data to zero for a predetermined percentage of the k frequencies to form modified frequency data;
   b) form a preliminary image comprising an array of retained pixel values based upon first positional data and the modified frequency data;
   c) set the frequency data to zero for a predetermined percentage of the k frequencies to form modified frequency data;
   d) form a modified image comprising an array of pixels based upon the positional data and the modified frequency data;
   e) compare the retained array of pixel values to the pixel values of the modified image formed at step (d);
   f) retain the minimum pixel value at each pixel location to form an image comprising minimum pixel values;
   g) repeat steps (c) through (f) for L iterations each time retaining an array of pixel values;
   h) output the image of retained pixel values.

9. The system of claim 8 wherein at step (c) the frequency data is set to zero for a predetermined percentage of k frequencies by randomly selecting which of the k frequencies will contain zero values.

10. The system of claim 8 wherein the number of iterations L is within the range of 10 to 1000.

11. The system of claim 8 wherein the projection data comprises radar data.

12. The system of claim 8 wherein the projection data comprises Synchronous Impulse Reconstruction (SIRE) radar data.

13. The system of claim 8 wherein the number of iterations L is within the range of 20 to 150.

14. A system for generating an image from projection data comprising:
   at least one processor for processing input data, the input data comprising positional data and image data, the image data comprising frequency data for a pre-determined number of frequency values;
   the at least one processor operating to perform minimizing operations on the pixel locations of the image by:
   a) creating a plurality of frequency data arrays by setting the frequency data to zero for a predetermined percentage of the frequency values to form modified frequency array data; the frequency data eliminated being different for each preliminary image;
   b) forming a plurality of modified preliminary images, each modified preliminary image comprising an array of pixels based upon the positional data and the modified frequency array data;
   c) comparing all the retained pixel values at each pixel location in the preliminary images, and retaining the minimum pixel value at each pixel location to form an image comprising minimum pixel values;
   d) output the image of minimum pixel values.

15. The system of claim 14 wherein the setting of the frequency data to zero for a predetermined percentage of the frequency values is performed by randomly selecting which of the frequency values will contain zero values.

16. The system of claim 14 wherein the number of modified preliminary images is within the range of 10 to 1000.

17. The system of claim 14 wherein the projection data comprises radar data.

18. The system of claim 14 wherein the projection data comprises Synchronous Impulse Reconstruction (SIRE) radar data.

19. The system of claim 14 wherein the number of modified preliminary images is within the range of 20 to 150.

\* \* \* \* \*